(12) United States Patent
Usui et al.

(10) Patent No.: US 7,408,854 B2
(45) Date of Patent: Aug. 5, 2008

(54) OPTICAL DISC REPRODUCING APPARATUS AND METHOD

(75) Inventors: Syunji Usui, Fukushima (JP); Masayuki Hori, Fukushima (JP)

(73) Assignee: D + M Holdings Inc. (JP)

( * ) Notice: Subject to any disclaimer, the term of this patent is extended or adjusted under 35 U.S.C. 154(b) by 857 days.

(21) Appl. No.: 10/950,659

(22) Filed: Sep. 28, 2004

(65) Prior Publication Data
US 2005/0111319 A1 May 26, 2005

(30) Foreign Application Priority Data

| Nov. 21, 2003 | (JP) | ............................. 2003-391538 |
| Dec. 26, 2003 | (JP) | ............................. 2003-434156 |
| Mar. 22, 2004 | (JP) | ............................. 2004-082003 |

(51) Int. Cl.
*G11B 20/10* (2006.01)

(52) U.S. Cl. .................................. 369/47.32; 369/30.27

(58) Field of Classification Search .............. 369/53.31, 369/53.25, 47.32, 47.36, 47.38, 47.55, 30.26, 369/30.27; 84/601, 602, 605
See application file for complete search history.

(56) References Cited

U.S. PATENT DOCUMENTS

| 5,289,439 | A | 2/1994 | Koulopoulos et al. |
| 6,751,167 | B2 * | 6/2004 | Yamada et al. ............ 369/30.19 |
| 6,967,905 | B2 * | 11/2005 | Miyashita et al. ......... 369/53.34 |
| 6,985,418 | B2 * | 1/2006 | Hori ........................... 369/53.3 |
| 7,042,814 | B2 * | 5/2006 | Yamada et al. ............ 369/30.26 |
| 7,115,807 | B2 * | 10/2006 | Yamada et al. ................. 84/602 |
| 7,218,578 | B2 * | 5/2007 | Usui ....................... 369/30.27 |
| 7,269,103 | B2 * | 9/2007 | Kataoka et al. ........... 369/30.36 |

FOREIGN PATENT DOCUMENTS

| EP | 1 260 978 A2 | 11/2002 |
| EP | 1 260 979 A2 | 11/2002 |
| EP | 1 304 700 A2 | 4/2003 |
| EP | 1 394 791 A2 | 3/2004 |
| JP | 03254455 | 11/1991 |
| JP | 11-86446 | 3/1999 |

OTHER PUBLICATIONS

Pioneer Operating Instructions for Compact Disc Player CDJ-1000, 20 pgs.

* cited by examiner

*Primary Examiner*—Thang V Tran
(74) *Attorney, Agent, or Firm*—Dickstein, Shapiro, LLP.

(57) ABSTRACT

An optical disc reproducing apparatus including: a reading unit which reads audio data recorded in an optical disc; a storage unit which stores the audio data read by the reading unit; an operation disc unit disposed turnably; a first detection unit which detects the turning speed and the turning direction of the operation disc unit and outputs a first signal indicating the turning speed and the turning direction; a second detection unit which detects that the outer circumference of the operation disc unit is pushed, and outputs a second signal indicating the pushing; and a controller which controls the reading speed and the reading sequence of the stored audio data from the storage unit, on the basis of the first signal when inputted the first signal and the second signal are outputted, and which controls the reading speed of the audio data stored in the storage unit, on the basis of the first signal when inputted only the first signal is outputted.

20 Claims, 15 Drawing Sheets

OPTICAL DISC REPRODUCING APPARATUS AND METHOD

BACKGROUND OF THE INVENTION

The present invention relates to an optical disc reproducing apparatus which can reproduce audio data read from an optical disc, at a desired reading speed and at a desired reading sequence, and a method for the apparatus.

A user, especially a "disc jockey (DJ)", who reproduces audio data by operating an optical disc reproducing apparatus, may perform a special reproduction, so-called "scratch reproduction" which produces an effect sound such as a scratch sound, while reproducing the audio data recorded in an analog record or an optical disc such as a compact disc (CD). When the user performs the scratch reproduction by use of the analogue record, this kind of scratch sound is generated by turning the analogue record rapidly in forward direction and in reverse direction. There is available a CD player for DJ, which allows performing a scratch reproduction similar to that using the analog record player.

This CD player for DJ is provided with an operation disc unit (hereinafter, timely called to as the "jog dial") and a storage unit (or memory). The audio data reproduced from the CD are stored in the memory, and the jog dial is turned clockwise or counter-clockwise. Thus, the CD player for the DJ can control the reading speed and the reading sequence of the audio data stored in the memory, thereby to provide an effect sound similar to the scratch sound for the analog record. The DJ can perform the scratch reproduction like that for the analog record by turning the jog dial as for the analog record while the audio data recorded in the CD is being reproduced by the CD player for DJ (as disclosed in the Unexamined Japanese Patent Application Laid-open Publication No. H11-86446).

The CD player for DJ disclosed in the above-specified Publication, reproduces the audio data recorded in the CD at a normal speed (hereinafter, called to as the "normal reproduction"), in case the jog dial is not operated. When the jog dial is turned, the CD player detects the turning speed and the turning direction of the jog dial thereby to perform the scratch reproduction, in which the reading speed and the reading sequence of the audio data reproduced from the CD and stored in the memory are varied according to the turning speed and the turning direction detected.

SUMMARY OF THE INVENTION

In the CD player for DJ described above, the turn of the jog dial may not stop promptly due to the inertia, in case the DJ turns the jog dial and release the hand from the jog dial. In the case of the scratch reproduction, the DJ turns the jog dial quickly clockwise or counter-clockwise. When the DJ releases the hand from the jog dial to finish the scratch reproduction and return the reproduction to the normal reproduction, it takes time to stop the turns of the jog dial due to the inertia. This time disables the DJ to return the reproduction to the normal reproduction from the scratch reproduction at the intended timing. Therefore, when using the CD player having the jog dial, user may find it difficult to produce an effective sound similar to that of the scratch reproduction for the analog record even if the jog dial is turned as for the analog record.

Moreover, the DJ may perform the operation, as called the "pitchbend", in which the analog record is turned at a higher or lower speed than the predetermined RPM while the analog record is being reproduced by the analog record player. By this pitchbend operation, the DJ is enabled to vary the reproducing speed of the audio data so that the reproducing speed matches to that of the audio data being reproduced by another analog record player. When these reproducing speeds matche, the two audio data can be switched without any disorder feel by switching the audio data being reproduced from another analog record player to the audio data reproduced at the adjusted reproducing speed.

This CD player for DJ is provided with a select button for selecting the operation functions (e.g., the scratch function or the pitchbend function) of the jog dial. The DJ operates the select button to switch the operation function of the jog dial from the scratch function to the pitchbend function. However, the DJ habituated to the operation of the analog record may feel the disorder because the operation to select the operation function of the jog dial by using the select button is different from that of the analog record player.

The present invention is useful to provide an optical disc reproducing apparatus which can reproduce an optical disc by an operation similar as reproducing an analog record.

The present invention is also useful to provide an optical disc reproducing apparatus which allows a user to perform the scratch reproduction or the pitchbend reproduction of an optical disc by an operation similar as performing the scratch reproduction or the pitchbend reproduction for an analog record.

In view of the situation above, according to a first mode of the present invention, there is provided an optical disc reproducing apparatus including: a reading unit which reads audio data recorded in an optical disc; a storage unit which stores the audio data read by the reading unit; an operation disc unit disposed turnably; a first detection unit which detects a turning speed and a turning direction of the operation disc unit, and outputs a first signal indicating the turning speed and the turning direction; a second detection unit, which detects that an outer circumference of the operation disc unit is pushed, and outputs a second signal indicating the pushing; and a controller which controls the reading speed and the reading sequence of the stored audio data from the storage unit, on the basis of the first signal when inputted the first signal and the second signal, and which controls the reading speed of the stored audio data from the storage unit, on the basis of the first signal when inputted only the first signal.

The optical disc reproducing apparatus may include: an operation unit which accepts an input to instruct the reading speed and the reading sequence of the stored audio data from the storage unit, wherein the operation unit includes; the operation disc unit; a table on which the operation disc unit is mounted; the first detection unit; and the second detection unit.

The controller may control, when only the first signal is outputted after the outputting of the first signal and the second signal, to read the audio data from the storage unit at a predetermined reading speed and in a predetermined reading sequence.

The optical disc reproducing apparatus may further include an elastic element disposed below the operation disc unit, wherein the operation disc unit is movable upward and downward by elastic force of the elastic element.

The optical disc reproducing apparatus may further include: a magnetic unit which makes the operation disc unit movable upward and downward by attractive force or repulsive force thereof.

The optical disc reproducing apparatus may further include: a magnetic unit which moves the operation disc unit upward and downward by the attractive force or the repulsive force thereof.

The optical disc reproducing apparatus may further include: a disc-shaped elastic element disposed below the operation disc unit; and a supporting element which supports the inner circumferences of the operation disc unit and the elastic element, wherein the second detection unit is disposed below the elastic element and outputs the second signal, when an outer circumference of the operation disc unit is pushed so that the circumference is brought into abutment against the elastic element by deformation of the elastic element according to the pushing.

The controller may control the controller controls, when only the first signal is outputted after the outputting of the first signal and the second signal, to read the stored audio data from the storage unit at a predetermined reading speed and in a predetermined reading sequence.

In the apparatus, a plurality of the second detection units may be disposed below the operation disc unit and at a common circumference.

The optical disc reproducing apparatus may further include: a disc-shaped mat interposed between the table and the operation disc unit and having an area substantially equal to that of the operation disc unit.

The optical disc reproducing apparatus may further include: a disc-shaped elastic element disposed below the operation disc unit; and a supporting element which supports inner circumferences of the operation disc unit and the elastic element, wherein the second detection unit is disposed below the elastic element and outputs the second signal, when an outer circumference of the operation disc unit is pushed so that it is brought into abutment against the elastic element by the deformation of the elastic element according to the pushing.

The controller may control, when only the first signal is outputted after the outputting of the first signal and the second signal, to read the stored audio data from the storage unit at a predetermined reading speed and in a predetermined reading sequence.

The optical disc reproducing apparatus may further include: a disc-shaped mat interposed between the operation disc unit and the elastic element and having an area substantially equal to that of the operation disc unit.

In view of the situation above, according to a second mode of the present invention, there is provided a reproducing apparatus operation device including a storage unit which stores audio data, and connected with an external reproduction apparatus which reproduces the stored audio data, wherein the operation device includes: an operation disc unit disposed turnably; a first detection unit which detects a turning speed and a turning direction of the operation disc unit, and outputs a first signal indicating the turning speed and the turning direction; a second detection unit which detects that the outer circumference of the operation disc unit is pushed, and outputs a second signal indicating the pushing; and a controller which controls the reading speed and the reading sequence of the stored audio data from the storage unit, on the basis of the first signal when inputted the first signal and the second signal, and which controls the reading speed of the stored audio data from the storage unit, on the basis of the first signal when inputted only the first signal.

In view of the situation above, according to a third mode of the present invention, there is provided an audio data reproducing method using an optical disc reproducing apparatus, the apparatus including: an operation disc unit disposed turnably; a first detection unit which detects a turning speed and a turning direction of the operation disc unit and outputs a first signal; second detection unit which detect that an outer circumference of the operation disc unit is pushed, and outputs a second signal indicating the pushing; a reading unit which reads audio data recorded in an optical disc; and a storage unit which stores the audio data read by the reading unit, the method including: controlling the reading speed and the reading sequence of the stored audio data from the storage unit, on the basis of the first signal when inputted the first signal and the second signal; and controlling the reading speed of the stored audio data from the storage unit, on the basis of the first signal when inputted only the first signal

BEST MODE FOR CARRYING OUT THE INVENTION

Embodiments of the present invention will be described with reference to the accompanying drawings.

Figure 1:
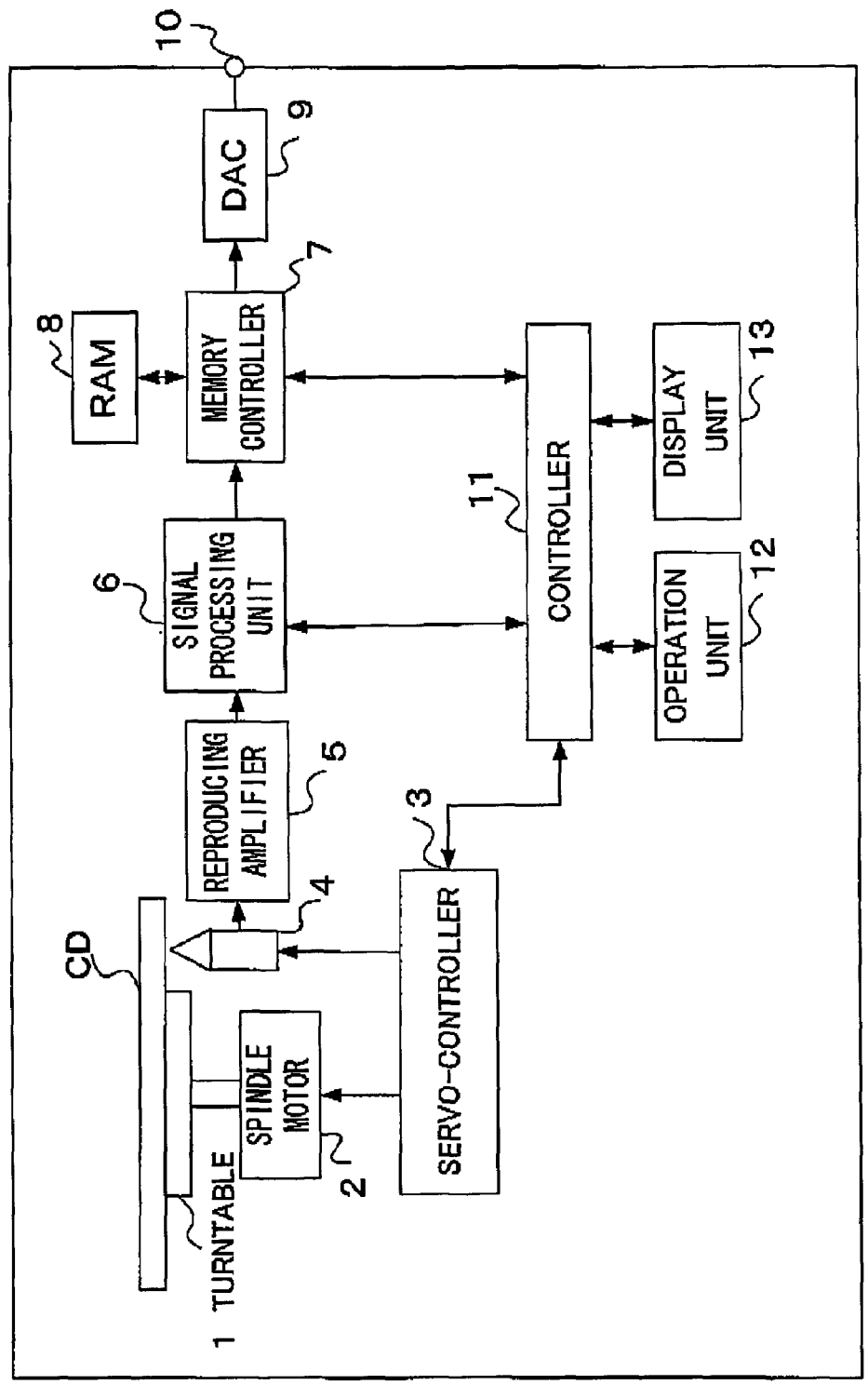
FIG. 1 is a block diagram showing a structure of a CD player according to an embodiment of the present invention.

FIG. 1 is a block diagram showing a structure of an optical disc reproducing apparatus according to one embodiment of the present invention.

The optical disc reproducing apparatus shown in FIG. 1, includes: a turntable 1; a spindle motor 2; a servo-controller 3; an optical pickup 4; a reproducing amplifier 5; a signal processing unit 6; a memory controller 7; a RAM (Random Access Memory) S; a DAC (Digital to Analog Converter) 9; an output terminal 10; a controller 11; an operation unit 12; and a display unit 13.

The optical disc reproducing apparatus according to the embodiment of the present invention is provided with an operating disc unit (or a jog dial) at the operation unit 12 so that the reading speed and the reading sequence of digital audio data reproduced from a CD and stored in the RAM 8 can be changed according to the turning speed and the turning direction of the operating disc unit. The optical disc reproducing apparatus is a CD player for DJ, for example.

A CD is fixed on the turntable 1 which is fixed on the spindle motor 2. When an instruction for starting the reproduction is inputted from the operation unit 12, the servo-controller 3 controls to drive the turning of the spindle motor 2 at a predetermined linear velocity. On the other hand, the servo-controller 3 controls a focus servo-circuit and a tracking servo-circuit (not shown), so that the pit line of the CD is correctly traced with a laser beam coming from the optical pickup 4.

The digital audio data which are read from the CD by the optical pickup 4, are shaped in a given waveform and amplified by the reproducing amplifier 5, and are inputted to the signal processing unit 6. This signal processing unit 6 inputs the digital audio data to the memory controller 7 by demodulating the digital audio data and by extracting error signals such as focus error signal or tracking error signals and synchronizing signals.

The memory controller 7 controls to input the inputted digital audio data to the RAM 8. This RAM 8 stores the digital audio data inputted. The digital audio data thus stored by the RAM 8 are read by the control of the memory controller 7 and are inputted to the DAC 9. This DAC 9 transforms the digital audio data into analog audio signals. These analog audio signals converted by the DAC 9 are outputted from the output terminal 11.

The display unit 13 displays the reproduction time of a track being reproduced, a track number and so on. The operation unit 12 is equipped with a jog dial unit, a reproduction button, a reproducing stop button and an eject button.

Figure 2:
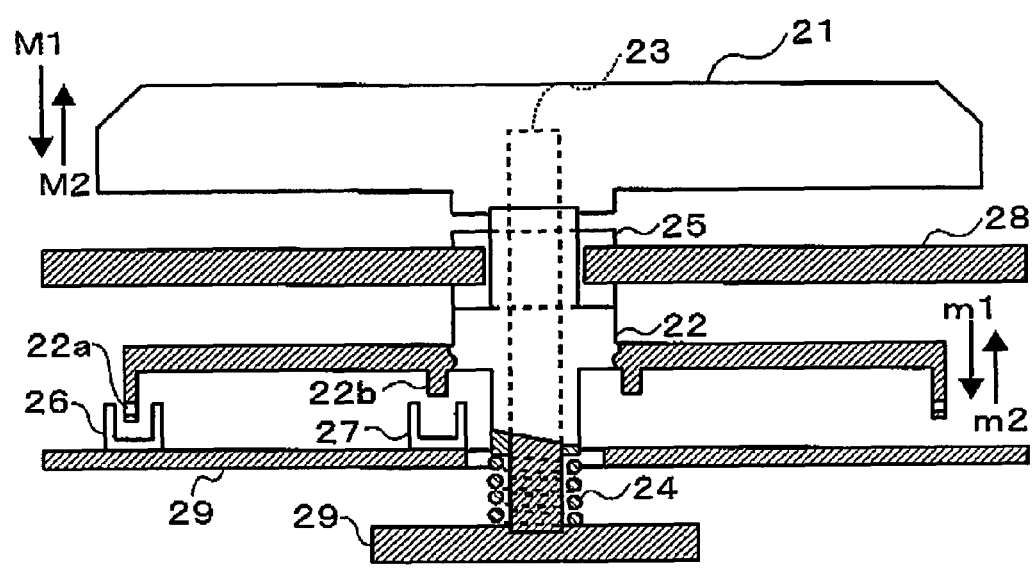
FIG. 2 is a diagram representing a side section (in which an operation disc unit is not pressed) of a jog dial unit of a first embodiment of the present invention.
Figure 3:
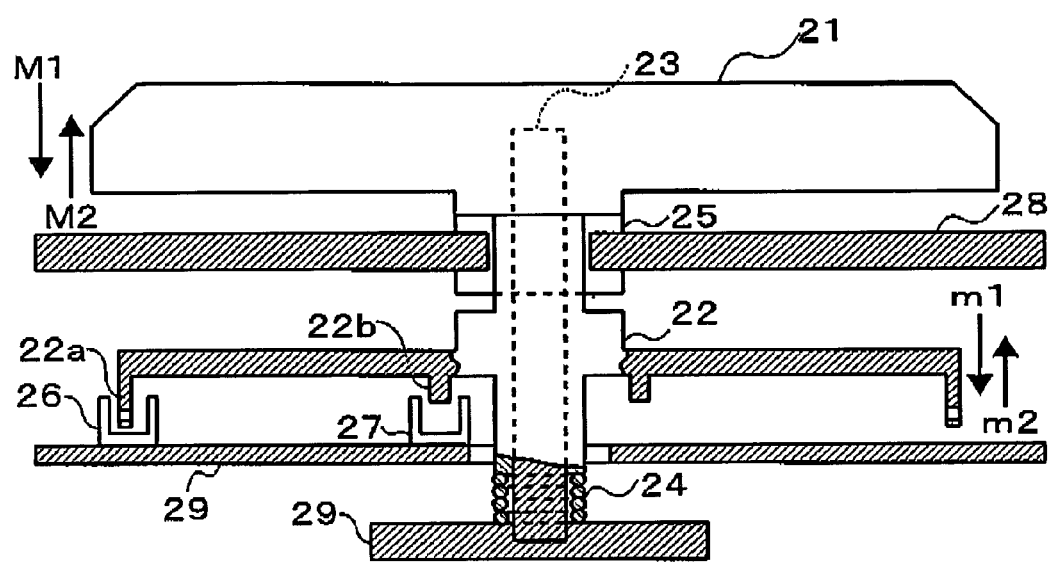
FIG. 3 is a diagram representing a side section (in which the operation disc unit is being pressed) of the jog dial unit of the first embodiment of the present invention.

FIG. 2 and FIG. 3 are diagrams representing the side sections of the jog dial unit which can be applied to the CD player shown in FIG. 1, according to a first embodiment. FIG. 2 and FIG. 3 represent such states of the jog dial unit of the first embodiment of the present invention that the later-described operation disc unit is not pushed and is pushed, respectively. As shown in FIG. 2 and FIG. 3, the jog dial unit of the first embodiment of the present invention is equipped with: an operation disc unit 21; a disc 22 having a slit portion 22a and a projection portion 22b; a spindle 23; an elastic element 24; a holding element 25; a first light sensor unit 26; a second light sensor unit 27; and a panel 28 which mounts the operation disc unit 22. In the CD player of the embodiment, the operation disc unit 21 is sized to have a diameter of 10 cm to 30 cm corresponding to the size of an analog record, and is mounted on the upper face of the casing 29 of the CD player.

The operation disc unit 21 is fixed on the spindle 23 with being inserted the spindle 23 into its central portion and screwed therewith (not shown). Likewise, the disc 22 is fixed on the spindle 23 with being inserted the spindle 23 into its central portion and screwed therewith (not shown). As a result, the operation disc unit 21 and the disc 22 are made into an integral structure through the spindle 23. When the operation disc unit 21 is turned by an operator, therefore, the disc 22 is also turned at the same turning speed and in the same turning direction as those of the operation disc unit 21. The spindle 23 is held by the holding element 25 which is attached to the panel 28, and is fixed turnably (rotatably) and vertically movably in the casing 29 via the elastic element 24 of a spring, rubber, etc. On the outer circumference of the disc 22, there is formed an annular side wall, in which the slit portion 22 as are formed. On the inner circumference of the disc 22, moreover, there is arranged the annular projection portion 22b. The slit portions 22a are exemplified by either a rectangular opening or a print pattern which is formed by printing a printing paint containing carbon.

The first light sensor unit 26 is equipped with two, not limited thereto, light sensors which detect the turning speed and turning direction of the disc 22 to turn with the operation disc unit 21, and is fixed at such positions in the casing 29 as to detect the slit portions 22a. The first light sensor unit 26 generates and outputs, when it detects the slit portion 22a, pulse signals a and b of different phases (e.g., pulse signals having a phase difference of 90 degrees) from the two light sensors to the controller 11. These pulse signals a and b of the different phase difference are called the "first control signal".

As shown in FIG. 3, the second light sensor unit 27 is mounted on the casing 29 at such a position as to detect the projection portion 22b when the operation disc unit 21 is pushed by the operator (e.g., a DJ) so that the disc 22 is lowered to a predetermined position while compressing the elastic element 24. The second light sensor unit 27 inputs, when it detects the projection portion 22b, second control signals in the controller 11.

The controller 11 determines the turning direction of the operation disc unit 21 on the basis of the phase difference between the pulse signals a and b of the first control signal inputted. In case the pulse signal a and the pulse signal b have the phase difference of 90 degrees, for example, the pulse signal a has a phase difference of +90 degrees from the pulse signal b when the operation disc unit 21 turns clockwise. When the operation disc unit 21 turns counter-clockwise, on the contrary, the pulse signal a has a phase difference of −90 degrees from the pulse signal b. Moreover, the controller 11 determines the turning speed of the operation disc unit 21 from the pulse number of either the pulse signal a or the pulse signal b of the first control signal inputted for a predetermined time period.

As will be described hereinafter, the controller 11 controls the memory controller 7 when both the first control signal and the second control signal are inputted, so that the digital audio data may be read from the RAM 8 at the reading speed and the reading sequence which correspond to the determined turning speed and direction of the operation disc unit 21. The memory controller 7 controls the reading speed and order (at which the audio data are read in the ascending or descending order), as stored in the RAM 8, of the digital audio data. If the operation disc unit 21 is turned clockwise, for example, the controller 11 controls to read the digital stored audio data from the RAM 8, at the ascending address. If the operation disc unit 21 is turned counter-clockwise, on the contrary, the controller 11 controls to read the stored digital audio data from the RAM 8, at the descending address.

As will be described hereinafter, moreover, the controller 11 controls the memory controller 7 such that the reading speed of the digital audio data from the RAM 8 may be increased or decreased according to the determined turning direction of the operation disc unit 21, when only the first control signal is inputted in the state where neither the first control signal nor the second control signal is inputted. The memory controller 7 thus controls the reading speed of the digital audio data stored in the RAM 8.

Here, the reproducing operations of the CD player having the jog dial unit of the first embodiment will be described.

Figure 4:
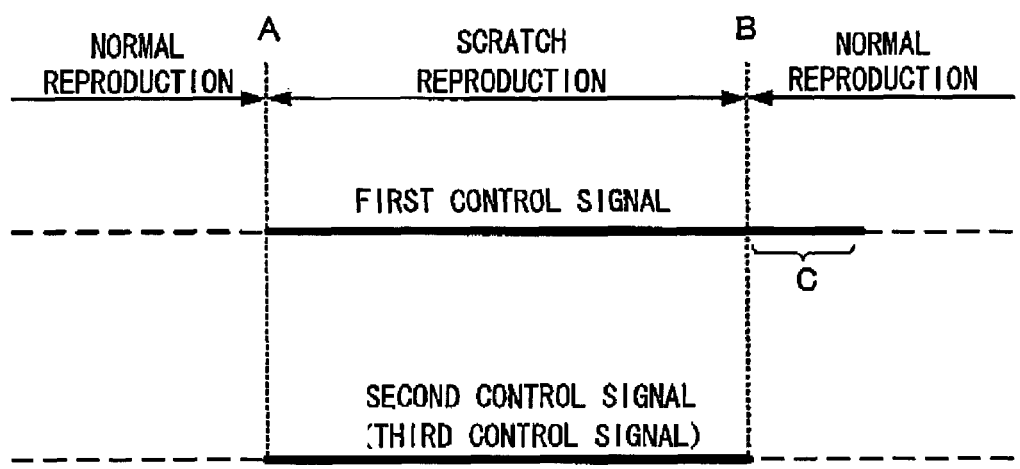
FIG. 4 is a diagram which explains a reproducing operation according to control signals.

FIG. 4 is a diagram which explains the reproducing operations responding to the control signals.

The user, for example DJ, pushes the reproduction button of the operation unit 12 thereby to start the normal reproduction of the audio data recorded in the CD. The CD player of the embodiment performs the normal reproduction when the first control signal and the second control signal are not inputted to the controller 11, that is, when the operation disc unit 21 is not turned.

In the case of a scratch reproduction, the operator turns the operation disc unit 21 manually quickly in the clockwise or counter-clockwise direction during the normal reproduction. When the scratch reproduction is done by using an analog record player, the DJ usually performs the turning operation while pushing the analog record so as to turn the analog record quickly against the turns of the turn table. When the DJ turns the operation disc unit 21 while pushing it with a similar operation feeling, the operation disc unit 21 is turned while being pushed downward. If the DJ thus performs the turning operation while pushing the operation disc unit 21, the elastic element 24 is compressed, as shown in FIG. 3, so that the operation disc unit 21 is lowered in the direction $M_1$ of the casing 29 with respect to the panel 28. Since the operation disc unit 21 and the disc 22 have the integral structure, the disc 22 is lowered in the direction $m_1$ of the casing when the operation disc unit 21 is lowered in the direction $M_1$ of the casing 29. When the disc 22 is lowered to a predetermined position, the second light sensor 27 detects the projection portion 22b and generates the second control signal. As a result, this second control signal is inputted to the controller 11. On the other hand, the first light sensor 26 generates, when it detects the slit portion 22a, the first control signal (i.e., the aforementioned pulse signal a and pulse signal b). As a result, the first control signal is inputted to the controller 11. When the DJ thus starts the turning operation, i.e., the scratch reproduction, while pushing the operation disc unit 21, the first control signal and the second control signal are inputted to the controller 1, as shown in FIG. 4, at and after the starting time A of the scratch reproduction.

The controller 11 determines, when both the first control signal and the second control signal are inputted, the turning speed and the turning direction of the operation disc unit 21 on the basis of the first control signal. Moreover, the controller 11 controls the memory controller 7 to read the digital audio data from the RAM 8 at the reading speed and in the reading sequence, which correspond to the determination results (i.e., the turning speed and the turning direction of the operation disc unit 21). When the operator releases the operation disc unit 21 to stop the scratch reproduction, the operation disc unit 21 is moved upward $M_2$ by elasticity of the elastic element 24 so that it backs to the position before being pushed, as shown in FIG. 2. Simultaneously, the disc 22 also moves upward $m_2$ so that the second light sensor 27 detects the projection portion 22b no more. In other words, at and after the ending time B of the stretch reproduction, the second light sensor 27 does not input second control signal to the controller 11. The controller 11 makes the memory controller 7, even when the first control signal is inputted from the first light sensor 26, to control to read the digital audio data from the RAM 8 at the reading speed of the normal reproduction time if the inputting of the second control signal from the second light sensor 27 stops. As shown in FIG. 4, more specifically, the controller 11 executes the control to read the digital audio data from the RAM 8 on the basis of the first control signal, in the cases (A and B) where both the first control signal and the second control signal are inputted, but executes the control to read the digital audio data from the RAM 8 at the reading speed of the normal reproduction time when the inputting of the second control signal stops but only the first control signal is inputted (for a time period C). Even when the first control signal generated by the first light sensor 26 is inputted to the controller 11 while the operation disc unit 21 is turned by the inertia (for the time period C in FIG. 4), the CD player of this embodiment can back in the normal reproduction from the scratch reproduction when the inputting of the second control signal to the controller 11 stops.

Here, the case of performing a pitchbend operation will be described. This pitchbend operation is the operation of an operator, in which the CD reproducing the audio data is manually turned at a higher or lower speed than a predetermined RPM.

In the case of the pitchbend operation, the user such as DJ pushes down the disc 22 with such a force that the disc 22 may not lower to a position where the second light sensor 27 detects the projection portion 22b, and turns the operation disc unit 21 clockwise or counter-clockwise. The first light sensor 26 generates the first control signal (i.e., the pulse signal a and the pulse signal b) when it detects the slit portion 22a. As a result, the first control signal is inputted to the controller 11. At this time, the disc 22 has not lowered to the position where the second light sensor 27 detects the projection portion 22b so that the second light sensor 27 does not output the second control signal.

The controller 11 determines the turning direction of the operation disc unit 21 on the basis of the phase difference between the pulse signal a and the pulse signal b of the first control signal, when it comes from the state in which the first control signal and the second control signal are not inputted, to the state in which only the first control signal is inputted. In accordance with that determination result (i.e., the turning direction of the operation disc unit 21), moreover, the controller 11 controls the memory controller 7 to execute the control to increase or decrease the reading speed of the digital audio data from the RAM 8. When the user turns the operation disc unit 21 clockwise, for example, the controller 11 controls the memory controller 7 so that the rate of reading the digital audio data from the RAM 8 increases according to the RPM (i.e., the pulse number of the pulse signal a or the pulse signal b inputted) of the operation disc unit 21. When the user turns the operation disc unit 21 counter-clockwise, the controller 11 controls the memory controller 7 so that the rate of reading the digital audio data from the RAM 8 decreases according to the RPM of the operation disc unit 21. As a result, the reproduction rate of the audio data can be changed, the user can make the reproduction rate match that of the audio data being reproduced from another CD player. When the reproduction rates match with each other, moreover, the two audio data can be switched without any physical disorder by switching the audio data being reproduced by another CD player to the audio data having the reproduction rate matched.

Figure 5:
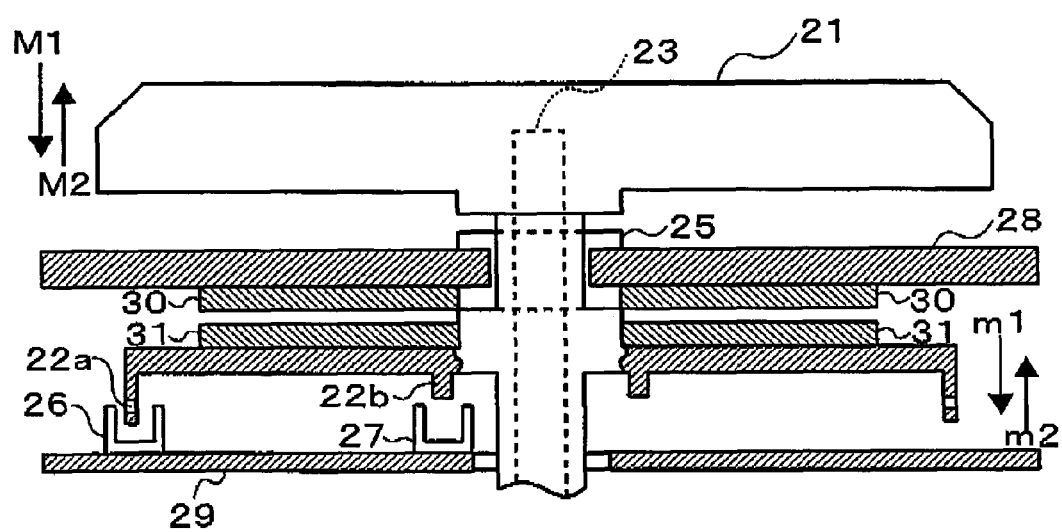
FIG. 5 is a diagram representing a side section of a jog dial unit of a second embodiment of the present invention with the operation disc unit being not pressed.
Figure 6:
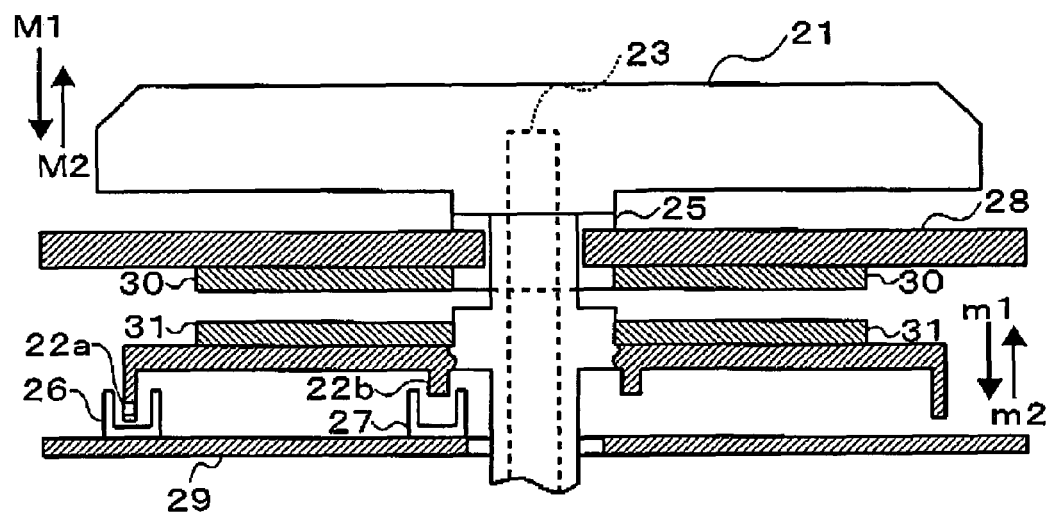
FIG. 6 is a diagram representing a side section of the jog dial unit of the second embodiment of the present invention with the operation disc unit being pressed.

FIG. 5 and FIG. 6 are diagrams representing the side sections of such a jog dial unit according to a second embodiment as can be applied to the CD player in FIG. 1. FIG. 5 and FIG. 6 show the jog dial unit according to the second embodiment in the states where the operation disc unit is not pushed and is being pushed. The description of the portions in FIG. 5 and FIG. 6 similar to those in FIG. 2 is omitted by designating them by the common reference numerals. Unlike the jog dial unit of the first embodiment, the jog dial unit shown in FIG. 5 and FIG. 6 is equipped with a first magnet 30 and a second magnet 31.

As shown in FIG. 5, the first magnet 30 is mounted on the lower face of the panel 28. The second magnet 31 is so mounted on the disc 22 as to confront the first magnet 30.

Moreover, the first magnet 30 and the second magnet 31 are so arranged that their different magnetic poles confront each other. With operation disc unit 21 being not pushed, therefore, the disc 22 is moved upward (toward the panel 28) by the attractive forces of the first magnet 30 and the second magnet 31. Simultaneously with this, the operation disc unit 21 is also moved upward $M_1$. When the operation disc unit 21 and the disc 22 move upward, as shown in FIG. 5, the projection portion 22b formed on the disc 22 is located at such a position as is not detected by the second light sensor 27.

Here, the reproducing operation of the CD player having the jog dial unit of the second embodiment will be described.

For the scratch reproduction, the user starts a manual turning operation like that of the first embodiment during the normal reproduction (in which the first control signal and the second control signal are not inputted to the controller 11). Then, the operation disc unit 21 lowers in the direction $M_2$ of the casing 29 toward the panel 28, as shown in FIG. 6, against the attractive forces of the first magnet 30 and the second magnet 31. Because of the integral structure of the operation disc unit 21 and the disc 22, the disc 22 likewise lowers in the direction $m_2$ toward the casing 29. When the disc 22 comes downward to a predetermined position, as shown in FIG. 6, the second light sensor 27 detects the projection portion 22b and generates the second control signal. This second control signal is inputted to the controller 11. On the other hand, the first light sensor 26 generates the first control signal (i.e., the pulse signal a and the pulse signal b) when it detects the slit portion 22a. As a result, the first control signal is inputted to the controller 11.

When both the first control signal and the second control signal are inputted, the controller 11 controls the memory controller 7 by a processing like that of the first embodiment, so that the digital audio data may be read from the RAM 8 at the reading speed and the reading sequence corresponding to the turning speed and the turning direction of the operation disc unit 21.

When the user releases the operation disc unit 21 and stops the scratch reproduction, the operation disc unit 21 is returned to the position before pushed, as shown in FIG. 5, by the attractive forces of the first magnet 30 and the second magnet 31. Simultaneously with this, the disc 22 also moves upward $m_2$ so that the second light sensor 27 does not detect the projection portion 22b. When the inputting of the second control signal from the second light sensor 27 stops even if the first control signal is inputted from the first light sensor 26, the controller 11 controls the memory controller 7 to execute the control to read the digital audio data from the RAM 8 at the reading speed of the normal reproduction time. In the cases (A and B) where both the first control signal and the second control signal are inputted to the controller 11, as shown in FIG. 4, the digital audio data are read from the RAM 8 on the basis of the first control signal. In the state (C) where the inputting of the second control signal stops so that only the first control signal is inputted to the controller 11, the digital audio data are read from the RAM 8 at the reading speed of the normal reproduction time. Even if the first control signal is inputted to the controller 11 while the operation disc unit 21 is being turned by the inertia (for the time period C in FIG. 4), the CD player of this embodiment can back in the normal reproduction when the inputting of the second control signal to the controller 11 stops.

Here, the case where the pitchbend operation is performed will be described.

In the case of the pitchbend operation, the user turns the operation disc unit 21 clockwise or counter-clockwise with such a force that the disc 22 may not lower to a position where the second light sensor 27 detects the projection portion 22b. Like the case of the first embodiment, the first light sensor 26 inputs the first control signal (i.e., the pulse signal a and the pulse signal b) to the controller 11 when it detects the slit portion 22a. At this time, the disc 22 has not lowered to the position where the second light sensor 27 can detect the projection portion 22b so that the second light sensor 27 does not output the second control signal.

When the controller 11 comes from the state in which the first control signal and the second control signal are not inputted, to the state in which only the first control signal is inputted, the controller 11 makes the memory controller 7, in the processing similar to that of the case of the pitchbend operation of the first embodiment, to execute such a control that the reading speed of the digital audio data from the RAM 8 is increased or decreased according to the turning direction of the operation disc unit 21.

Figure 7:
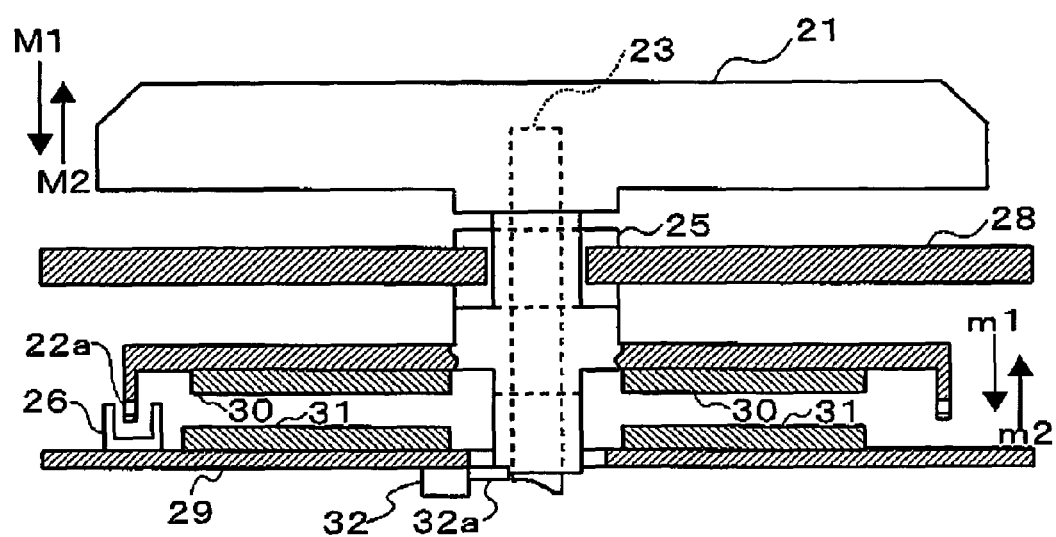
FIG. 7 is a diagram representing a side section of a jog dial unit of a third embodiment of the present invention with the operation disc unit being not pressed.
Figure 8:
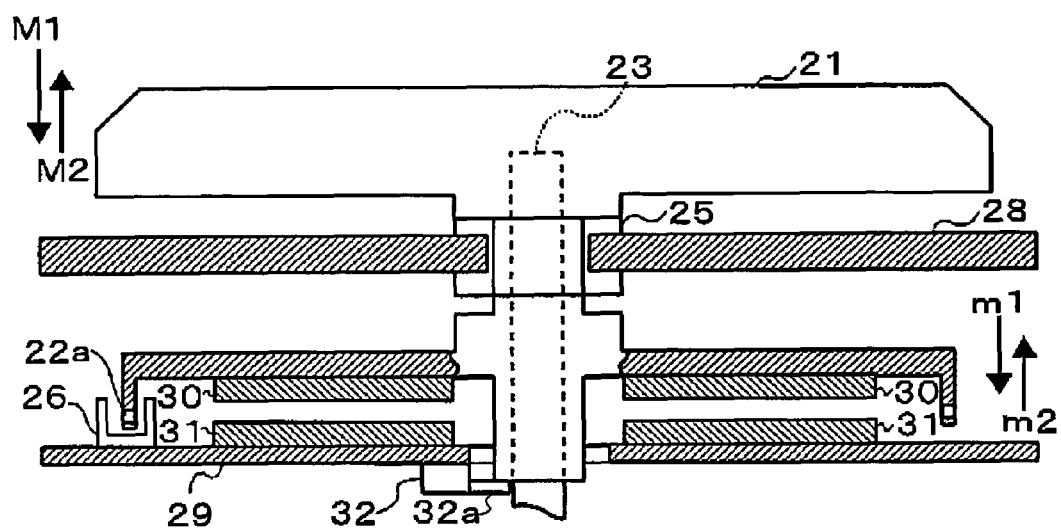
FIG. 8 is a diagram representing a side section of the jog dial unit of the third embodiment of the present invention with the operation disc unit being pressed.

FIG. 7 and FIG. 8 are diagrams representing the side sections of such a jog dial unit according to a third embodiment as can be applied to the CD player in FIG. 1. FIG. 7 and FIG. 8 show the jog dial unit according to the third embodiment in the respective states where the operation disc unit is not pushed and is being pushed. The description of the portions in FIG. 7 and FIG. 8 similar to those in FIG. 5 is omitted by designating them by the common reference numerals.

As shown in FIG. 8, a detecting switch 32 is so fixed on the casing 29 that a switch portion 32a and the disc 22 may abut against each other. When the operation disc unit 21 lowers to a predetermined position so that the disc 22 depresses the switch portion 32a of the detecting switch 32 to a predetermined extent, the detecting switch 32 inputs a third control signal (corresponding to the second control signal generated by the aforementioned second light sensor 27) to the controller 11. The first magnet 30 is mounted on the lower face of the disc 22. The second magnet 31 is so mounted on the casing 29 as to confront the first magnet 30. Moreover, the first magnet 30 and the second magnet 31 are so mounted that their identical magnetic poles may confront each other. When the operation disc unit 21 is not pushed, therefore, the disc 22 is moved upward (toward the panel 28) $m_1$ by the repulsive forces of the first magnet 30 and the second magnet 31, and the operation disc unit 21 also moves upward $M_1$. When the operation disc unit 21 and the disc 22 moved upward, as shown in FIG. 7, the disc 22 is located at the position in which it does not push the switch portion 32a of the detecting switch 32.

Here, the reproducing operation of the CD player having the jog dial unit of the third embodiment will be described.

For the scratch reproduction, the user starts a manual turning operation like those of the first embodiment and the second embodiment during the normal reproduction (in which the first control signal and the second control signal are not inputted to the controller 11). Then, the operation disc unit 21 lowers in the direction $M_1$ of the casing 29 toward the panel 28, as shown in FIG. 8, against the attractive forces of the first magnet 30 and the second magnet 31. Because of the integral structure of the operation disc unit 21 and the disc 22, the disc 22 likewise lowers in the direction $m_1$ toward the casing 29. When the disc 22 comes downward to a predetermined position to push the switch portion of the detecting switch 32, the detecting switch 32 generates a third signal. This third control signal is inputted to the controller 11. On the other hand, the first light sensor 26 inputs the first control signal (i.e., the pulse signal a and the pulse signal b) to the controller 11, as in the cases of the first and second embodiments, when it detects the slit portion 22a. At and after the reproduction starting time A of the scratch reproduction, as shown in FIG. 4, the first control signal and the third control signal are inputted to the controller 11.

When both the first control signal and the third control signal are inputted, the controller 11 controls the memory controller 7 in a processing like those of the first and second embodiments, so that the digital audio data may be read from the RAM 8 at the reading speed and the reading sequence corresponding to the turning speed and the turning direction of the operation disc unit 21.

When the user releases the operation disc unit 21 and stops the scratch reproduction, the operation disc unit 21 is returned to the position before pushed, as shown in FIG. 7, by the repulsive forces of the first magnet 30 and the second magnet 31. Simultaneously with this, the disc 22 also moves upward $m_2$. As a result, the disc 22 does not push the switch portion 32a of the detecting switch 32. When the inputting of the third control signal from the detecting switch 32 stops even if the first control signal is inputted from the first light sensor 26, the controller 11 makes the memory controller 7 to execute the control to read the digital audio data from the RAM 8 at the reading speed of the normal reproduction time. In the cases (A and B) where both the first control signal and the third control signal are inputted to the controller 11, as shown in FIG. 4, the digital audio data are read from the RAM 8 on the basis of the first control signal. In the state where the inputting of the third control signal stops so that only the first control signal is inputted to the controller 11, the digital audio data are read from the RAM 8 at the reading speed of the normal reproduction time. Even if the first control signal is inputted to the controller 11 while the operation disc unit 21 is being turned by the inertia (for the time period C in FIG. 4), the CD player of this embodiment can back in the normal reproduction when the inputting of the third control signal to the controller 11 stops.

Here, the case where the pitchbend operation is performed will be described.

In the case of the pitchbend operation, the user turns the operation disc unit 21 clockwise or counter-clockwise with such a force that the disc 22 may not lower to a position where the disc 22 pushes the switch portion 32a of the detecting switch 32. Like the cases of the first and second embodiments, the first light sensor 26 inputs the first control signal (i.e., the pulse signal a and the pulse signal b) to the controller 11 when it detects the slit portion 22a. At this time, the disc 22 does not push the switch portion 32a of the detecting switch 32 so that the detecting switch 32 does not the third control signal.

When the controller 11 comes from the state in which the first control signal and the third control signal are not inputted, to the state in which only the first control signal is inputted, the controller 11 makes the memory controller 7, in the processing similar to that of the case of the pitchbend operation of the second embodiment, to execute such a control that the reading speed of the digital audio data from the RAM 8 is increased or decreased according to the turning direction of the operation disc unit 21.

Figure 9:
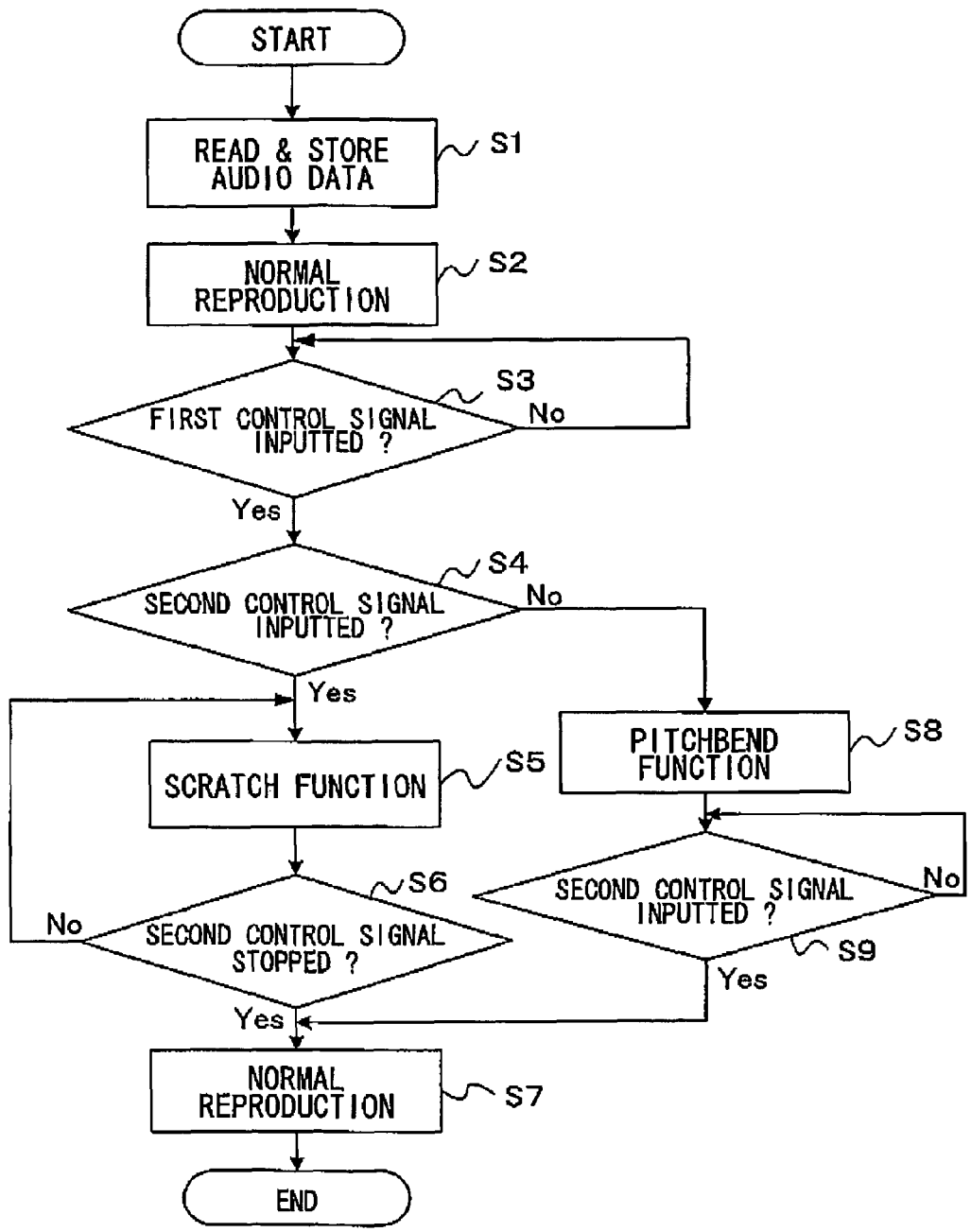
FIG. 9 is a flow chart which explains the reproducing operations of the CD player according to the embodiments of the present invention.

FIG. 9 is a flow chart which explains the reproducing operations of the CD player having the jog dial unit according to the first to third embodiments of the present invention.

First of all, the controller 11 controls to read the digital audio data stored in the CD and to store the read digital audio data in the RAM 8 (Step S1).

Next, the controller 11 controls to read the digital audio data at the reading speed of the normal reproduction time from the RAM 8 (Step S2). Specifically, when the first control signal and the second control signal (or the third control signal) are not inputted, the controller 11 makes the memory controller 7 to make a control to read the digital audio data from the RAM 8 at the reading speed of the normal reproduction time.

Next, the controller 11 monitors whether or not the first control signal has been inputted from the first light sensor 26 to the controller 11 (Step S3). When the controller 11 determines that the first control signal has been inputted (Step S3: Yes), the routine advances to the following Step S4. Note that, the case in which it is determined that the first control signal has been inputted, occurs when the operation disc unit 21 is turned so that the first light sensor 26 detects the slit portion 22a and outputs the first control signal (i.e., the pulse signal a and the pulse signal b).

Next, it is determined whether or not the second control signal has been inputted to the controller 11, or whether or not the third control signal has been inputted to the controller 11 (Step S4). The controller 11 performs the processing Step S5, in case it determines that the second control signal or the third control signal has been inputted Step S4: Yes). In case it is determined that neither the second control signal nor the third control signal has been inputted (that is, in case only the first control signal has been inputted to the controller 11), the processing Step S8 is performed (Step S4: No).

Here, the determination that the second control signal or the third control signal has been inputted to the controller 11 is made at Step S3 either in case the operation disc unit 21 is turned while being pushed downward so that the second light sensor 27 detects the projection portion 22b and outputs the second control signal (that is, in case both the first control signal and the second control signal are inputted to the controller 11), or in case the disc 22 pushes the switch portion 32a of the detecting switch 32 so that the detecting switch 32 outputs the third control signal (that is, in case both the first control signal and the third control signal are inputted to the controller 11). Therefore, in the cases (A and B) the user starts the turning operation while pushing the operation disc unit 21, i.e., the scratch reproduction so that either the first control signal and the second control signal or the first control signal and the third control signal are inputted to the controller 11, as shown in FIG. 4, the controller 11 determines that either the second control signal or the third control signal has been inputted.

Next, in case the controller 11 determines that the second control signal or the third control signal has been inputted (that is, in case either the second control signal and the first control signal or the third control signal and the first control signal have been inputted) (Step S4 in FIG. 9: Yes), the controller 11 controls to bring the operation function of the operation disc unit 21 into the scratch function (Step S5). On the basis of the first control signal outputted from the first light sensor 26, specifically, the controller 11 controls the reading speed and the reading sequence (according to the sequence, the audio data are to be read at the ascending address or the descending address) of the digital audio data from the RAM 8.

Moreover, the controller 11 determines whether or not the inputting of the second control signal or the third control signal to the controller 11 has stopped (Step S6). When the controller 11 determines that the inputting of the second control signal or the third control signal has stopped (Step S6: Yes), the controller 11 performs the normal reproduction (Step S7).

Here, the determination that the inputting of the second control signal or the third control signal has stopped is made either in case the operation disc unit 21 is returned by the elastic force of the elastic element 24 to the position before pushed (as referred to FIG. 2) so that the second light sensor 27 outputs no second control signal, or in case the detecting switch 32 outputs no third control signal.

At the normal reproduction time, the controller 11 executes the control to read the digital audio data from the RAM 8 at the reading speed of the normal reproduction time. Specifically, the controller 11 controls the memory controller 7 to make the control to read the digital audio data from the RAM 8 at the reading speed of the normal reproduction time. When the user stops the turning operation of the operation disc unit 21, the inputting of the second control signal or the third control signal to the controller 11 stops, even if the operation disc unit 21 is turned by the inertia, as for the time period C in FIG. 4, so that the first control signal is inputted to the controller 11. Even if the first control signal is inputted, the controller 11 executes the control to perform the normal reproduction when the inputting of the second control signal or the third control signal stops. When the turning operation of the operation disc unit 21 stops, therefore, the normal reproduction can be returned from the scratch reproduction.

When it is determined that the second control signal and the third control signal are not inputted (Step S4 in FIG. 9: No), the controller 11 performs the control to bring the operation function of the operation disc unit 21 into the pitchbend function (Step S8). That is, the controller 11 executes the control to bring the operation function of the operation disc unit 21 into the pitchbend function when only the first control signal is inputted. On the basis of the first control signal inputted from the first light sensor 26, specifically, the controller 11 makes the memory controller 7 to execute the control to increase or decrease the reading speed of the digital audio data from the RAM 8.

After this, the controller 11 monitors whether or not the inputting of the first control signal has stopped (Step S9). Here, the determination that the inputting of the first control signal has stopped is made by the controller 11, in case the turning of the operation disc unit 21 stops so that the first light sensor 26 outputs no first control signal. The controller 11 performs the normal reproduction (Step S7), in case it determines that the inputting of the first control signal has stopped (Step S9: Yes). Thus, the controller 11 executes the aforementioned control to read the digital audio data from the RAM 8 at the reading speed of the normal reproduction time.

In the second and third embodiments, either the first magnet 30 or the second magnet 32 may also be made of an iron plate. In the second embodiment and the third embodiment, moreover, the first magnet 30 and the second magnet 32 may also be made of an electromagnet. Then, the attractive forces or the repulsive forces of the electromagnets may be adjusted by adjusting the electric currents to flow through the electromagnets.

In the CD player having the jog dial unit according to the first to third embodiments, as has been described hereinbefore, the reproduction can be returned from the scratch reproduction to the normal reproduction, instantly, as the user releases the hand from the operation disc unit 21 to stop the scratch reproduction after having pushed the operation disc unit 21 with the hand for the scratch reproduction. Moreover, the user can perform the scratch reproduction or the pitchbend operation in accordance with the force to push the operation disc unit 21.

Next, a fourth embodiment of the present invention will be described with reference to the accompanying drawings.

Figure 10:
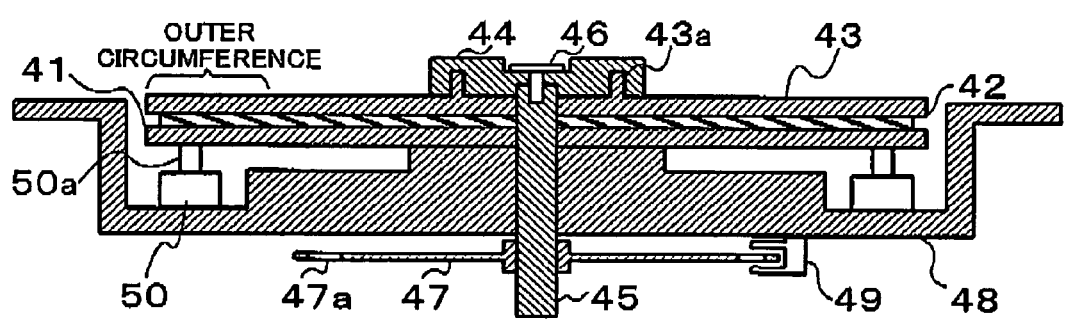
FIG. 10 is a diagram representing a side section of a jog dial unit of a fourth embodiment of the present invention with the operation disc unit being not pressed.
Figure 11:
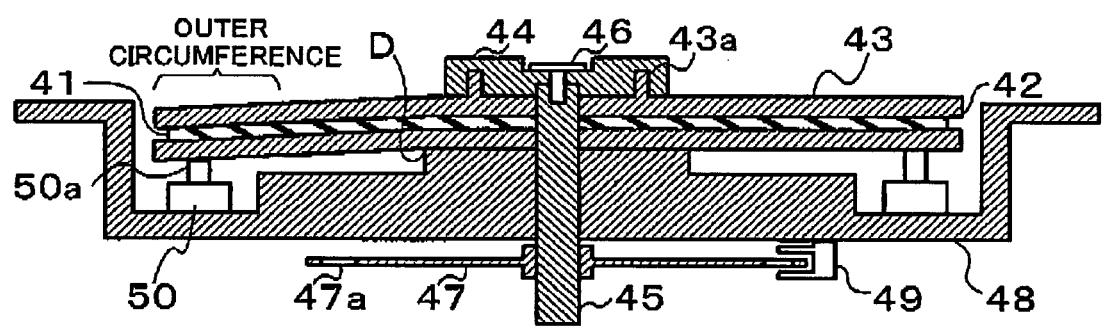
FIG. 11 is a diagram representing a side section of the jog dial unit of the fourth embodiment of the present invention with the operation disc unit being pressed.

FIG. 10 and FIG. 11 are diagrams representing the side sections of the jog dial unit, which can be applied to the operation unit 12 of the CD player in FIG. 1, according to a fourth embodiment. FIG. 10 and FIG. 11 present such states of the jog dial unit of the fourth embodiment that the disc unit is not pushed and is pushed, respectively.

The jog dial unit, as shown in FIG. 10 and FIG. 11, is equipped with: a table 41; a mat 42; an operation disc unit 43 having a projection portion 43a formed thereon; a holder 44; a spindle 45; a screw 46; a scale 47 having a slit portion 47a formed therein; a light sensor 49 mounted on the casing 48 of the CD player; and push detectors 50 each having a switch portion 50a.

Figure 12:
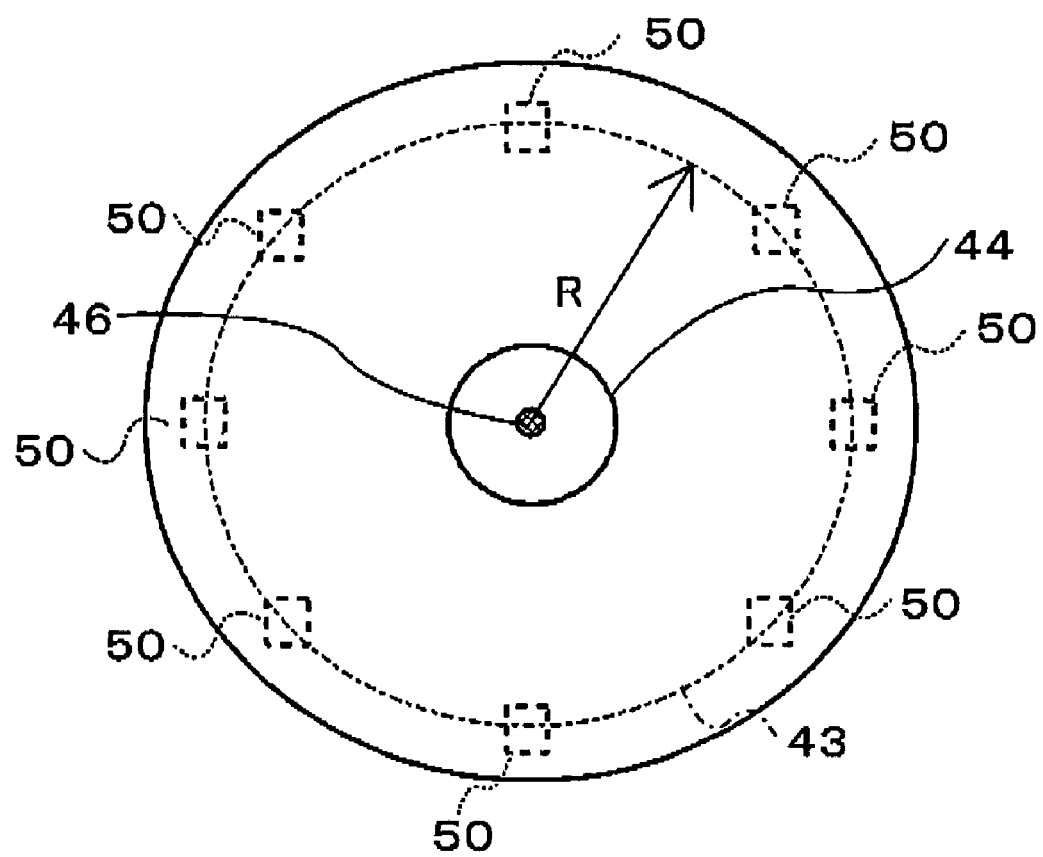
FIG. 12 is a diagram representing the upper face of such a jog dial unit of the fourth embodiment of the present invention as is disposed in the operation unit the CD player.

FIG. 12 represents a top plan view of the jog dial unit which provided on the operation unit 12 of the CD player according to the fourth embodiment of the present invention. In the CD player of the embodiment, the operation disc unit 43 is sized to have a diameter of 10 cm to 30 cm corresponding to the size of an analog record, and is mounted on the upper face of the CD player.

The table 41 is fixed on the casing 48. The mat 42 is placed on the upper face of the table 41 with being inserted the spindle 45 into its central portion. The operation disc unit 43 is placed on the upper face of the mat 42 with being inserted the spindle 45 into its central portion. The mat 42 is used to allow the operation disc unit 43 to turn smoothly on the table 41. The mat 42 is given a contour substantially identical to that of the operation disc unit 43, and is made of a resin material or the like having a small friction coefficient and hardly generating static electricity. The table 41, the mat 42 and the operation disc unit 43 correspond to the turntable, the slip mat and the analog record in the analog record player used by users. Therefore, the user can operate the CD player of the embodiment with an operation feeling similar to that for the analog record player. On the other hand, the table 41 is made of a polycarbonate resin or the like. If the operation disc unit 43 is made of such a material as allows the operation disc unit 43 to turn smoothly on the table 41 and as hardly generates static electricity, the aforementioned mat 42 needs not to be provided between the table 41 and the operation disc unit 43. The holder 44 is placed on the upper face of the operation disc unit 43 with being inserted the spindle 45 into its central portion. The holder 44 is fixed on the spindle 45 by means of the screw 46 such that the projection portion 43a formed on the operation disc unit 43 is inserted into the recess portion formed in the holder 44. Therefore, the operation disc unit 43 can turn on the upper face of the table 41 through the mat 42 without leaving the spindle 45.

The scale 47 is fixed on the spindle 45 with being inserted the spindle 45 into its central portion and by means of the screw (not shown). The operation disc unit 43 and the scale 47 are made into an integral structure through the spindle 45. When the operation disc unit 43 is turned, therefore, the scale 47 is also turned at the same turning speed and in the same turning direction as those of the operation disc unit 43. The scale 47 has slit portions 47a formed in its outer circumference. The slit portion 47a is exemplified by either a rectangular opening or a print pattern which is formed by printing a printing paint containing carbon.

The light sensor unit 49 (the first detector) is equipped with two, not limited thereto, light sensors, and is fixed at such positions in the casing 48 as to detect the slit portion 47a, for detecting the turning speed and turning direction of the scale 47 which turns with the operation disc unit 43. The light sensor unit 49 generates, when it detects the slit portion 47a, pulse signals a and b of different phases (e.g., a phase difference of 90 degrees) from the two light sensors. These first control signals a and b are inputted to the controller 11.

The push detectors 50 acting as the second detector are arranged on the casing 48, as shown in FIG. 12, at equal intervals on the common circumference of a circle having a radius R on the spindle 45. This radius R is substantially equal to the length from the spindle 45 to the outer circumference of the operation disc unit 43. The number of the push detectors 50 is determined according to the size of the operation disc unit 43 and the elastic strengths of the table 41 and the operation disc unit 43. Here are provided eight push detectors 50, but not limited thereto. These push detectors 50 are exemplified by the soft touch type push switches (providing a reduced resistance when the switch portions 50a are depressed). The displacement (or stroke) of the switch portions 50a is about 0.5 mm, for example.

In case the operator (e.g., DJ) of the CD player pushes the operation disc unit 43 at the outer circumference, as shown in FIG. 11, the table 41, the mat 42 and the operation disc unit 43 are bent downward on a point D. At this time, the push detectors 50 generate the second control signal when the outer circumference of the table 41 depresses the switch portions 50a of the push detectors 50. The second control signal is inputted to the controller 11.

The controller 11 determines the turning direction of the operation disc unit 43 on the basis of the phase difference between the pulse signals a and b of the first control signal inputted. In case the pulse signal a and the pulse signal b have the phase difference of 90 degrees, for example, the pulse signal a has a phase difference of +90 degrees from the pulse signal b when the operation disc unit 43 turns clockwise. When the operation disc unit 43 turns counter-clockwise, on the contrary, the pulse signal a has a phase difference of −90 degrees from the pulse signal b. Moreover, the controller 11 determines the turning speed of the operation disc unit 43 from the pulse number of either the pulse signal a or the pulse signal b of the fist control signal inputted for a predetermined time period.

As will be described hereinafter, the controller 11 controls the memory controller 7 when both the first control signal and the second control signal are inputted, so that the digital audio data is read from the RAM 8 at the reading speed and the reading sequence which correspond to the determined turning speed and direction of the operation disc unit 43. The memory controller 7 controls the reading speed and sequence (in which the audio data are read in the ascending or descending sequence), as stored in the RAM 8, of the digital audio data. If the operation disc unit 43 is turned clockwise, for example, the controller 11 controls to read the digital audio data stored in the RAM 8, in the ascending address and at the reading speed according to the turning speed. If the operation disc unit 43 is turned counter-clockwise, on the contrary, the controller 11 controls to read the digital audio data stored in the RAM 8, in the descending address and at the reading speed according to the turning speed (i.e., the scratch function).

Moreover, the controller 11 controls the memory controller 7 such that the reading speed of the digital audio data from the RAM 8 may be increased or decreased according to the determined turning direction of the operation disc unit 43 when only the first control signal is inputted from the state in which neither the first control signal nor the second control signal is inputted. The memory controller 7 controls (i.e., the pitch-bend function) the reading speed of the digital audio data stored in the RAM 8.

Here, the CD player reproducing operations of the fourth embodiment will be described. The DJ pushes there production button of the operation unit 12 thereby to start the normal reproduction of the audio data recorded in the CD. The CD player of the embodiment performs the normal reproduction like the CD players of the first to third embodiments, when neither the first control signal nor the second control signal is inputted to the controller 11.

In the case of a scratch reproduction, the user turns the operation disc unit 43 manually quickly in the clockwise or counter-clockwise direction during the normal reproduction.

When the scratch reproduction is done by using an analog record player, the user usually performs the turning operation while pushing the analog record, as has been described hereinbefore. At this time, the user turns the analog record more easily by touching the outer circumference of the analog record rather than the inner circumference with the hand. As a result, the operation disc unit 43 is turned with its outer circumference being pushed downward, when the user operates the operation disc unit 43 by an operation feeling like that for the analog record.

When the user performs the turning operation while pushing the outer circumference of the operation disc unit 43, the table 41, the mat 42 and the operation disc unit 43 are bent downward on the point D by the pushing force, as shown in FIG. 11. When the outer circumference of the table 41 then depresses the switch portion or portions 50a of one or plural push detectors 50, the push detector or detectors 50 generate and output the second control signal to the controller 11. On the other hand, the light sensor 49 generates, when it detects the turning slit portion 47a, the first control signal (i.e., the aforementioned pulse signal a and pulse signal b). This first control signal is inputted to the controller 11. When the user thus starts the turning operation, i.e., the scratch reproduction while pushing the outer circumference of the operation disc unit 43, therefore, the first control signal and the second control signal are inputted like the first embodiment and so on to the controller 1, as shown in FIG. 4, at and after the starting time A of the scratch reproduction.

When both the first control signal and the second control signal are inputted, the controller 11 determines the turning speed and the turning direction of the operation disc unit 43 on the basis of the first control signal. Moreover, the controller 11 controls the memory controller 7 so that the digital audio data may be read from the RAM 8 at the reading speed and in the reading sequence, which correspond to the determination results (i.e., the turning speed and the turning direction of the operation disc unit 43).

When the user releases the operation disc unit 43 to stop the scratch reproduction, the table 41, the mat 42 and the operation disc unit 43 are returned by the elasticity to the position before the operation disc unit 43 is pushed, as shown in FIG. 10. When the table 41 does not depress the switch portion 50a of the push detector 50, this push detector 50 stops the outputting of the second control signal. Like the first and other embodiments, at and after the ending time B of the scratch reproduction, the inputting of the second control signal to the controller 11 stops, as shown in FIG. 4. The controller 11 controls the memory controller 7, even when the first control signal is inputted from the light sensor 39, to make the control to read the digital audio data from the RAM 8 at the reading speed of the normal reproduction time if the inputting of the second control signal from the push detector 50. As shown in FIG. 4, more specifically, the digital audio data are read from the RAM 8 on the basis of the first control signal, in the cases (A and B) where both the first control signal and the second control signal are inputted to the controller 11, but the digital audio data are read from the RAM 8 at the reading speed of the normal reproduction time when the inputting of the second control signal stops but only the first control signal is inputted (for a time period C). Even when the first control signal is inputted to the controller 11 while the operation disc unit 43 is turned by the inertia, the CD player of this embodiment can back in the normal reproduction from the scratch reproduction when the inputting of the second control signal to the controller 11 stops.

Here, the case of performing a pitchbend operation will be described.

In the case of the pitchbend operation, the user turns the operation disc unit 43 clockwise or counter-clockwise during the normal reproduction with such a force that the table 41, the mat 42 and the operation disc unit 43 is not bent. The light sensor 49 generates the first control signal (i.e., the pulse signal a and the pulse signal b) when it detects the slit portion 47a. This first control signal is inputted to the controller 11. At this time, the table 41 does not depress the switch portion 50a of the push detector 50 so that the push detector 50 does not input the second control signal to the controller 11.

The controller 11 determines the turning direction of the operation disc unit 43 on the basis of the phase difference between the pulse signal a and the pulse signal b of the first control signal, when it comes from the state in which the first control signal and the second control signal are not inputted, to the state in which only the first control signal is inputted. In accordance with that determination result (i.e., the turning direction of the operation disc unit 43), moreover, the controller 11 makes the memory controller 7 to execute the control to increase or decrease the reading speed of the digital audio data from the RAM 8. When the user turns the operation disc unit 43 clockwise, for example, the controller 11 controls the memory controller 7 so that the rate of reading the digital audio data from the RAM 8 increases according to the turning speed (i.e., the pulse number of the pulse signal a or the pulse signal b inputted) of the operation disc unit 43. When the user turns the operation disc unit 43 counter-clockwise, the controller 11 controls the memory controller 7 so that the rate of reading the digital audio data from the RAM 8 may drop according to the turning speed of the operation disc unit 43. When the inputting of the first control signal stops, the controller 11 makes the memory controller 7 to execute the control to read the digital audio data from the RAM 8 at the reading speed of the normal reproduction time.

The CD player having the jog dial unit according to this embodiment performs the reproducing operations according to the flow chart in FIG. 9. Therefore, the reproducing operations of the CD player of the embodiment will be described with reference to the flow chart in FIG. 9. Here is omitted the description of the processings like those of the reproducing operations of the CD players of Embodiments 1 to 3.

In the CD player having the jog dial unit of the fourth embodiment, the controller 11 performs at first the processings Step S1 and Step S2 like those of the CD player of Embodiments 1 to 3, and the monitors whether or not the first control signal has been inputted from the light sensor 49 to the controller 11 (Step S3). If the operation disc unit 43 is turned so that the light sensor 49 detects the slit portion 47a and outputs the first control signal (i.e., the pulse signal a and the pulse signal b) to the controller 11. Then, the controller 11 determines that the first control signal has been inputted (Step S3: Yes), and then determines whether or not the second control signal has been inputted to the controller 11 (Step S4). Here, it is determined that the second control signal has been inputted to the controller 11 when the operation disc unit 43 is turned while being pushed downward at its outer circumference so that the table 41 depresses the switch portion 50a of the push detector 50 and so that the push detector 50 outputs the second control signal (that is, when both the first control signal and the second control signal are inputted to the controller 11). When the user starts the turning operation while pushing the outer circumference of the operation disc unit 43, therefore, the controller 11 determines that the second control signal has been inputted (Step S4: Yes).

At this time, the controller 11 executes the aforementioned control to perform the operation function of the jog dial unit as the scratch function on the basis of the first control signal inputted from the light sensor 49 (Step S5). Moreover, the controller 11 determines whether or not the inputting of the second control signal from the push detector 50 has stopped (Step S6). When the turning operation for the scratch reproduction is stopped so that the table 41, the mat 42 and the operation disc unit 43 back in the state (as referred to FIG. 10) before the operation disc unit 43 is pushed, the table 41 does not depress the switch portion 50a of the push detector 50. As a result, the push detector 50 inputs second control signal to the controller 11 no more. Then, this controller 11 determines that the inputting of the second control signal has stopped (Step S6: Yes), and executes the aforementioned control (Step S7) to read the digital audio data from the RAM 8 at the reading speed of the normal reproduction time. In other words, the controller 11 makes the control to perform the normal reproduction when the inputting of the second control signal stops, even if the first control signal is inputted. When the DJ ends the operation to turn the operation disc unit 43, therefore, the inputting of the second control signal to the controller 11 stops so that the normal reproduction can be promptly changed from the scratch reproduction, even if the operation disc unit 43 is further turned by the inertia (that is, even if the first control signal is inputted to the controller 11).

In case, on the contrary, it is determined that the second control signal has not been inputted (namely, that only the first control signal has been inputted to the controller 11) (Step S4: No), the controller 11 executes the aforementioned control to change the operation function of the jog dial unit into the pitchbend function (Step S9) After this, the controller 11 monitors whether or not the inputting of the first control signal has stopped (Step S9). When the controller 11 determines that the inputting of the first control signal from the light sensor 49 has stopped (that is, the turnings of the operation disc unit 43 have stopped) (Step S9: Yes), the controller 11 executes the aforementioned control to read the digital audio data from the RAM 8 at the reading speed of the normal reproduction time (Step S7).

The description thus far made adopts the push type switch as the second detector of the fourth embodiment. The second detector of the fourth embodiment may also be a light sensor. In case the light sensor is employed as the second detector, it is fixed on the casing 48 at such a position as to detect the outer circumference of the table 41 when the outer circumference of the table 41 is bent to a predetermined position.

In the CD player having the jog dial unit according to the fourth embodiment, as has been described herein before, the reproduction can be returned from the scratch reproduction to the normal reproduction, like the CD players of the first to third embodiments, instantly as the user releases the hand from the operation disc unit 43 to end the scratch reproduction after having pushed the operation disc unit 43 with the hand for the scratch reproduction. Moreover, the user can perform the scratch reproduction or the pitchbend operation in accordance with the force to push the operation disc unit 43.

Figure 13:
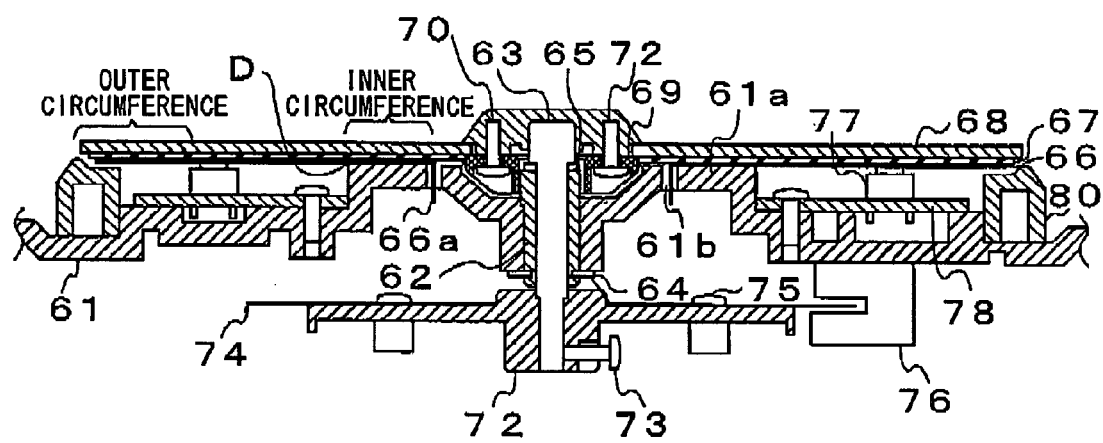
FIG. 13 is a diagram representing a side elevation of a jog dial unit of a fifth embodiment of the present invention.

FIG. 13 is a diagram representing a side elevation of a jog dial unit, which can be applied to the operation unit 12 of the CD player in FIG. 1, according to a fifth embodiment.

The jog dial unit shown in FIG. 13 is provided with: a supporting element 61a formed in the casing 61 of the CD player and having holes 61b; a bearing 62; a spindle 63; an E-ring 64; a washer 65; an elastic element 66 having protruding portions 66a; a mat 67; an operation disc unit 68; a guide 69; a holder 70; screws 71, 73, 75 and 79; a scale holder 72; a scale 74; a turn detector 76; push detectors 77; a base plate 78; and a stopper 80. In the CD player of this embodiment, the operation disc unit 68 is sized to have a diameter of about 12 cm.

In FIG. 13, the casing 61 is equipped with the supporting element 61a which supports the operation disc unit 68, the mat 67 and the elastic element 66. The supporting element 61a is formed into a circular shape having a diameter of 4 to 6 cm around the spindle 63, and has the plural holes 61b. The bearing 62 is fixed in the casing 61 through the E-ring 64. The spindle 63 is inserted into the bearing 62 through the washer 65. The supporting element 61a supports the elastic element 66 such that the protruding portions 66a formed on the elastic element 66 are inserted into the holes 61b.

The elastic element 66 is a disc-shaped leaf spring having a radius substantially equal to that of the operation disc unit 68 and made of a metal. Moreover, the elastic element 66 is fixed at its inner circumference on the supporting element 61a by means of an adhesive member such as double-coated tape.

The mat 67 is made of such a disc as is shaped to have a radius substantially equal to that of the operation disc unit 68. This mat 67 is placed on the upper face of the elastic element 66 with being inserted the spindle 63 into its central portion. The operation disc unit 68 is formed of such a disc as is made of vinyl chloride or the like and has a diameter of about 12 cm. The operation disc unit 68 is placed on the upper face of the mat 67 with being inserted the spindle 63 into its central portion. As a result, the supporting element 61a supports the inner circumferences of the elastic element 66, the mat 67 and the operation disc unit 68. The mat 67 is used for allowing the operation disc unit 68 to turn smoothly on the elastic element 66. This mat 67 is made of such a resin material as has a small friction coefficient and hardly generates static electricity. The elastic element 66, the mat 67 and the operation disc unit 68 correspond to the turn table, the slip mat and the analog record in the analog record player to be used by the DJ, etc. Therefore, the user can operate the CD player of this embodiment with an operation feeling similar to that of the analog record player.

The guide 69 determines the mounted position of the mat 67. The holder 70 is press-fitted in the spindle 63 from the upper face of the operation disc unit 68. Moreover, the holder 70 is fixed on the guide 69 by means of the screw 71.

The operation disc unit 68 is clamped between the guide 69 and the holder 70. As the user turns the operation disc unit 68, therefore, the operation disc unit 68, the holder 70 and the spindle 63 rotate together. On the other hand, the holder 70 is provided with marks indicating the turning positions so that the user is able to recognize the turning state of the operation disc unit 68 visually.

The scale holder 72 is fixed on one end of the spindle 63 by means of the screw 73. The scale 74 is fixed on the scale holder 72 by means of the screw 75. As a result, the operation disc unit 68 and the scale 74 can turn together through the spindle 63. The scale 74 is provided in its outer circumference with rectangular slit portions at equal intervals. In case the scale 74 is made of a metal material, its slit portions are formed into openings of a rectangular shape. However, the shape of the openings should not be limited to the rectangular shape but may be arbitrary. Moreover, the scale 74 is printed in case it is made of a transparent or semitransparent plastic material.

The turn detector 76 is a light sensor which detects the turning state (i.e., the turning angle and the turning direction) of the scale 74 to turn together with the operation disc unit 68. The turn detector 76 is configured to include a light sensor a and a light sensor b, and is so fixed on the back face of the casing 61 as to detect the slit portions of the scale 74. The turn detector 76 generates, when it detects the slit portion formed in the scale 74, the pulse signal a and the pulse signal b of different phases (e.g., a phase difference of 90 degrees) as the first control signal from the two light sensors. This first control signal is inputted to the controller 11.

Like the push detector 50 in FIG. 12, the push detectors 77 are arranged on the upper face of the casing 61 at, preferably, equal intervals on the common circumference of a circle having the radius R around the spindle 63. This radius R is substantially equal to the length from the spindle 63 to the outer circumference of the operation disc unit 68. The number of the push detectors 77 is determined according to the size of the operation disc unit 68 and the elasticity of the elastic element 67. These push detectors 77 are exemplified by the soft touch type push switches, the portions of which have a weak activation force (1N or less), and may have a displacement (or stroke) of 0.3 mm or less.

In case the user pushes the operation disc unit 68 at the outer circumference, the elastic element 66, the mat 67 and the operation disc unit 68 are bent downward on the point D shown in FIG. 13. At this time, the push detectors 77 generate the push detection signals as the second control signal when the outer circumference of the elastic element 66 depresses the switch portions of the push detectors 77, and output the push detection signals to the controller 11.

The elastic element 66 is made of a leaf spring, as described above, and is elastically deformed and bent by the pushing force when the outer circumference of the operation disc unit 68 is pushed. When the user stops the pushing of the outer circumference of the operation disc unit 68, the elastic element 66 backs to the state before elastically deformed. As a result, the outer circumference of the elastic element 66 is released from the pushing of the switch portions of the push detectors 77 so that the push detectors 77 outputs the second control signal no more. Moreover, the casing 61 is provided on its upper face with the stopper 80 which restricts the downward movement of the operation disc unit 68 due to the bending so that the switch portions of the push detectors 77 is not move longer than the predetermined displacement. Therefore, the provision of the stopper 80 can prevent unnecessary load from being applied to the switch portions of the push detectors 77.

The controller 11 determines the turning direction of the operation disc unit 68 on the basis of the phase difference between the pulse signals a and b of the first control signal inputted from the turn detector 76. In case the pulse signal a and the pulse signal b have the phase difference of 90 degrees, for example, the pulse signal a has a phase difference of +90 degrees from the pulse signal b when the operation disc unit 68 turns clockwise. When the operation disc unit 68 turns counter-clockwise, on the contrary, the pulse signal a has a phase difference of −90 degrees from the pulse signal b.

Moreover, the controller 11 determines the turning speed of the operation disc unit 68 from the pulse number of either the pulse signal a or the pulse signal b of the turn detection signals inputted for a predetermined time period.

As will be described hereinafter, the controller 11 controls the memory controller 7 when both the first control signal and the second control signal are inputted, so that the digital audio data is read from the RAM 8 at the reading speed and the reading sequence which correspond to the determined turning speed and direction of the operation disc unit 68. Like the case of the fourth embodiment, the memory F controller 7 controls (i.e., the scratch function) the reading speed and sequence (in which the audio data are read in the ascending or descending order), as stored in the RAM 8, of the digital audio data.

Moreover, the controller 11 controls the memory controller 7 such that the reading speed of the digital audio data from the RAM 8 is increased or decreased according to the determined turning direction of the operation disc unit 68 when only the first control signal is inputted from the state in which neither the first control signal nor the second control signal is inputted. The memory controller 7 controls the reading speed of the digital audio data stored in the RAM 8 (i.e., the pitchbend function).

Here, the CD player reproducing operations having the jog dial unit of the fifth embodiment will be described.

Figure 14:
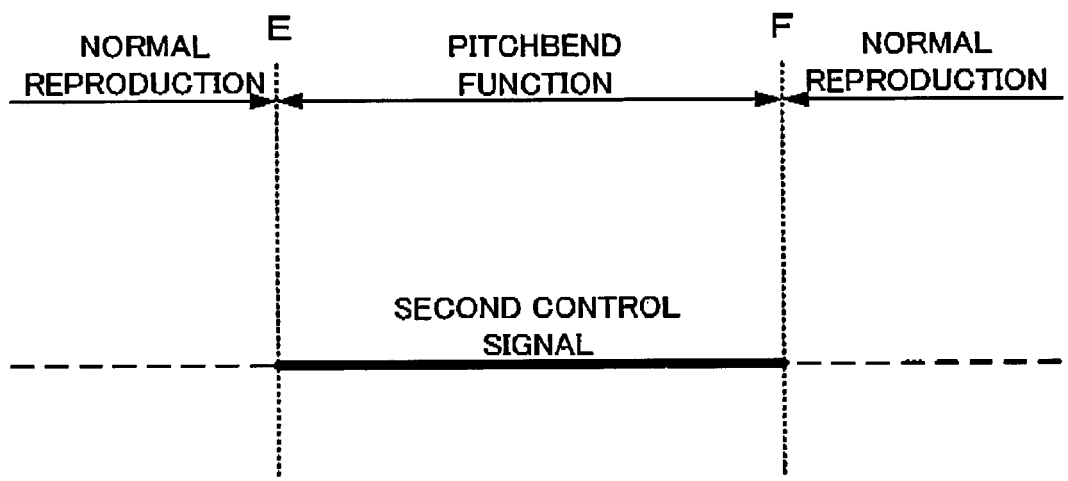
FIG. 14 is a diagram which explains the reproducing operations of digital audio data recorded in a CD.

FIG. 14 is a diagram which explains the reproducing operations of digital audio data recorded in a CD of the CD player having the jog dial unit of this embodiment.

The user pushes the reproduction button of the operation unit 12 thereby to start the normal reproduction of the audio data recorded in the CD. The CD player of the embodiment performs the normal reproduction like the CD player of the first embodiment, when neither the turn detection signal nor the push detection signal is inputted to the controller 11.

In the case of a scratch reproduction, the user turns the operation disc unit 68 manually quickly in the clockwise or counter-clockwise direction during the normal reproduction. When the scratch reproduction is done by using an analog record player, the user usually performs the turning operation while pushing the analog record, as has been described hereinbefore. At this time, the user can turn the analog record more easily by touching the outer circumference of the analog record rather than the outer circumference with the hand. As a result, the operation disc unit 68 is turned with its outer circumference being pushed downward, when the user operates the operation disc unit 68 by an operation feeling like that for the analog record.

When the user performs the turning operation while pushing the outer circumference of the operation disc unit 68, the elastic element 66, the mat 67 and the operation disc unit 68 are elastically deformed to be bend downward on the point D, as shown in FIG. 13, by the pushing force. When the outer circumference of the elastic element 66 then depresses the switch portion or portions of one or plural push detectors 77, the push detector or detectors 77 generate the second control signal. This output the second control signal is inputted to the controller 11. On the other hand, the rotation detector 76 generates, when it detects the slit portion formed in the scale 64, the first control signal (i.e., the aforementioned pulse signal a and pulse signal b). This first control signal is inputted to the controller 11. When the user thus starts the turning operation, i.e., the scratch reproduction while pushing the outer circumference of the operation disc unit 68, therefore, the first control signal and the second control signal are inputted like the first embodiment and so on to the controller 11, as shown in FIG. 4, at and after the starting time A of the scratch reproduction.

When both the first control signal and the second control signal are inputted, the controller 11 determines the turning speed and the turning direction of the operation disc unit 68 on the basis of the first control signal. Moreover, the controller 11 controls the memory controller 7 so that the digital audio data is read from the RAM 8 at the reading speed and in the reading sequence, which correspond to the determination results (i.e., the turning speed and the turning direction of the operation disc unit 68).

While the user is turning the operation disc unit 68 by pushing the outer circumference, the operation disc unit 68 comes into abutment the stopper 80, even if the force to push the operation disc unit 68 increases, so that unnecessary load can be prevented from being applied to the push detectors 77. Moreover, the elastic element 66 is fixed on the supporting element 61a by the adhesive member. Even if the operation disc unit 68 turns, therefore, its turning force is not transmitted to the push detectors 77. Therefore, the CD player of this embodiment can prevent the push detectors 77 from being damaged by the turning operation of the operation disc unit 68. Even if the adhesive member peels, the raised portions 66a of the elastic element 66 are inserted in the holes 61b formed in the supporting element 61a so that the elastic element 26 can be prevented from being turned. When the user releases the hand from the operation disc unit 68 to stop the scratch reproduction, the elastic element 66 backs in the state before elastically deformed, and the operation disc unit 68 backs in the state before pushed.

When the elastic element 66 releases the switch portions of the push detectors 77 from their pushed state, the push detectors 77 stop the outputting the second control signal to the controller 11.

The controller 11 controls the memory controller 7, even when the first control signal is inputted from the rotation detector 76, to make the control to read the digital audio data from the RAM 8 at the reading speed of the normal reproduction time if the inputting of the second control signal from the push detector 77. As shown in FIG. 4, more specifically, the digital audio data are read from the RAM 8 on the basis of the first control signal, in the cases (A and B) where both the first control signal and the second control signal are inputted to the controller 11, but the digital audio data are read from the RAM 8 at the reading speed of the normal reproduction time when the inputting of the second control signal stops but only the first control signal is inputted to the controller 11 (for the time period C). Even when the first control signal is inputted to the controller 11 while the operation disc unit 68 is turned by the inertia (for the time period C in FIG. 6), the CD player of this embodiment can be changed to the normal reproduction from the scratch reproduction when the inputting of the second control signal to the controller 11 stops.

Here, the case of performing a pitchbend operation will be described.

In the case of the pitchbend operation, the user turns the inner circumference of the operation disc unit 68 manually clockwise or counter-clockwise during the normal reproduction. The supporting element 61a is disposed below the inner circumference of the operation disc unit 68. Even if the inner circumference of the operation disc unit 68 is turned clockwise or counter-clockwise with being pushed, the elastic element 66 is not elastically deformed. As a result, the mat 67 and the operation disc unit 68 are not bent, but the elastic element 66 releases the switch portions of the push detectors 77 from being pushed, so that the push detectors 77 do not output the second control signal. Since the operation disc unit 68 is turning, on the other hand, the rotation detector 76 detects the slit portions formed in the scale 74 and generates the first control signal (i.e., the pulse signal a and the pulse signal b) to be outputted to the controller 11.

The controller 11 determines the turning direction of the operation disc unit 68 on the basis of the phase difference between the pulse signal a and the pulse signal b of the first control signal, when it comes from the state, in which i the first control signal and the second control signal are not inputted, to the state in which only the first control signal is inputted. In accordance with that determination result (i.e., the turning direction of the operation disc unit 68), moreover, the controller 11 makes the memory controller 7 to execute the control to increase or decrease the reading speed of the digital audio data from the RAM 8. When the user starts the operation to turn the inner circumference of the operation disc unit 68 clockwise, only the first control signal is inputted to the controller 11 at and after a starting time E of the turning operation, as shown in FIG. 14. In response to the first control signal inputted, the controller 11 controls the memory controller 7 so that the rate of reading the digital audio data from the RAM 8 increases according to the turning speed (i.e., the pulse number of the pulse signal a or the pulse signal b inputted) of the operation disc unit 68. When the user turns the operation disc unit 68 counter-clockwise, the controller 11 controls the memory controller 7 in response to the first control signal inputted, so that the rate of reading the digital audio data from the RAM 8 decreases according to the RPM of the operation disc unit 68. When the user stops the turning operation of the operation disc unit 68, the turn detector 76 inputs no more first control signal to the controller 11. When the inputting of the first control signal from the turn detector 76 stops, the controller 11 makes the memory controller 7, at and after a stopping time F of the inputting of the first control signal, as shown in FIG. 14, to execute the control to read the digital audio data from the RAM 8 at the reading speed of the normal reproduction time.

The CD player having the jog dial unit according to this embodiment performs the reproducing operations according to the flow chart in FIG. 9. Therefore, the reproducing operations of the CD player of the embodiment will be described with reference to the flow chart in FIG. 9. Here is omitted the description of the processings like those of the reproducing operations of the CD players of Embodiments 1 to 4.

In the CD player having the jog dial unit of the fifth embodiment, the controller 11 performs at first the processings of Step S1 and Step S2 like those for the CD player of Embodiments 1 to 4, and monitors whether or not the first control signal has been inputted from the turn detector 76 (Step S3). If the operation disc unit 68 is turned so that the turn detector 76 detects the slit portions of the scale 74 and outputs the first control signal (i.e., the pulse signal a and the pulse signal b) to the controller 11. Then, the controller 11 determines that the first control signal has been inputted (Step S3: Yes), and then determines whether or not the second control signal has been inputted to the controller 11 (Step S4). Here, the determination that the second control signal has been inputted to the controller 11 is made when the operation disc unit 68 is turned by the user while being pushed downward at its outer circumference so that the elastic element 66 is elastically deformed to depress the switch portion of the push detector 77 (that is, when both the first control signal and the second control signal are inputted to the controller 11).

In case the controller 11 determines that the second control signal has been inputted (that is, in case the first control signal and the second control signal have been inputted) (Step 4: Yes), the controller 11 executes the aforementioned control to execute the operation function of the jog dial unit as the scratch function on the basis of the first control signal inputted from the turn detector 76 (Step S5). Moreover, the controller 11 determines whether or not the inputting of the second control signal has stopped (Step S6). When the user stops the turning operation of the operation disc unit 68, the elastic element 66 backs in the state before elastically deformed, and the operation disc unit 68 backs in the state before pushed. As a result, the elastic element 66 does not depress the switch portions of the push detectors 77 so that the push detectors 77 inputs the second control signal to the controller 11 no more. Then, the controller 11 determines that the inputting of the second control signal has stopped (Step S6: Yes), and executes the aforementioned control to read the data from the RAM 8 at the reading speed of the normal reproduction time (Step S7). In other words, the controller 11 makes the control to perform the normal reproduction when the inputting of the second control signal stops, even if the first control signal is inputted. Like the cases of Embodiments 1 to 4, therefore, when the user stops the operation to turn the operation disc unit 68, the inputting of the second control signal to the controller 11 stops so that the normal reproduction can be promptly returned from the scratch reproduction, even if the operation disc unit 68 is turned by the inertia (that is, even if the first control signal is inputted to the controller 11).

In case, on the contrary, it is determined that the second control signal has not been inputted (namely, that only the first control signal has been inputted to the controller 11) (Step S4: No), the controller 11 executes the control to change the operation function of the jog dial unit into the pitchbend function, on the basis of the first control signal inputted from the turn detector 76 (Step S8) When the user turns the inner circumference of the operation disc unit 68 (Step S3), the pushing force is applied to the supporting element 61*a*, and the elastic element 66 is not elastically deformed, so that the mat 67 and the operation disc unit 68 are not bent. As a result, the elastic element 66 releases the switch portions of the push detectors 77 from the pushed state, and the push detectors 77 do not generate the second control signal, so that the controller 11 performs the normal reproduction (Step S7).

After this, the controller 11 monitors whether or not the inputting of the first control signal from the turn detector 76 has stopped (Step S9). When the controller 11 determines that the inputting of the first control signal from the turn detector 76 has stopped (that is, the turnings of the operation disc unit 43 have stopped) (Step S9: Yes), the controller 11 executes the aforementioned control to read the digital audio data from the RAM 8 at the reading speed of the normal reproduction time (Step S7).

In the CD player of this embodiment, as described above, the user turns the operation disc unit 68 while pushing the outer circumference of the disc, thereby to operate the scratch function. Moreover, the CD player of this embodiment, as the CD player of Embodiments 1 to 4, can back to the normal reproduction from the scratch reproduction, instantly as the user releases the operation disc unit 68 to stop the scratch reproduction while the scratch reproduction is being performed according to the turning state of the operation disc unit 68. When the user turns the inner circumference of the operation disc unit 68 manually, moreover, the CD player can perform the pitchbend function. According to the CD player of this embodiment, moreover, the user can operate the scratch reproduction and the pitchbend reproduction properly merely by changing the position to turn the operation disc unit 68.

Figure 15:
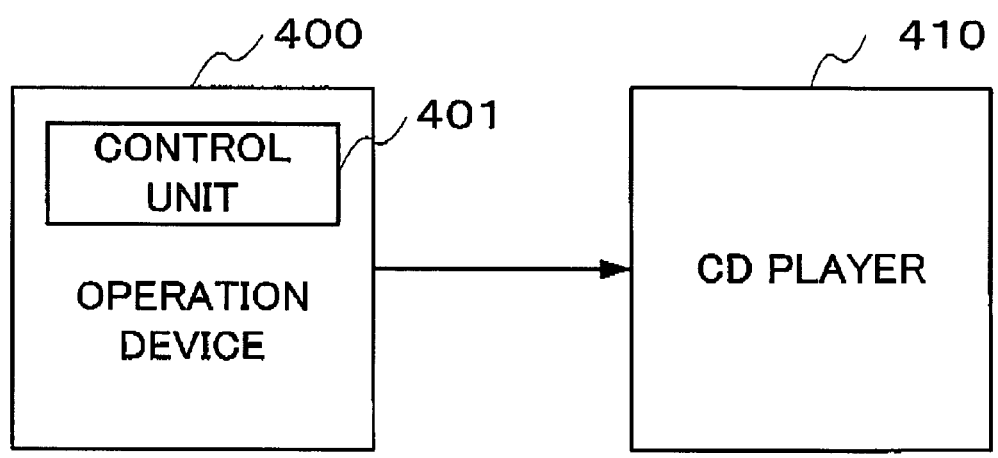
FIG. 15 is a diagram showing a state, in which the CD player according to the embodiments of the present invention and an operation device are connected.

The first to fifth embodiments have been described hereinbefore on the structure, in which the operation unit 12 and a reading unit such as the optical pickup 4 are integrated. However, the present invention should not be limited thereto but may be modified such that the operation unit and the reading unit are separated. As shown in FIG. 15, for example, the operations (e.g., the ordinary operation and the special operation) may be performed on the data, which are inputted through an operation device 400 including the aforementioned operation unit 12 and a controller 401, from a CD player 410 connected with the operation device 400. In this modification, for example, the controller 401 of the operation device 400 makes, when it detects the operation input from the user, a control to perform the aforementioned special reproduction operations on the audio data stored in the memory disposed the operation device 400 or the CD player 410, so that the desired data can be reproduced.

The foregoing description has been made on the CD player which reproduces the audio data stored in the CD. However, the present invention may also be applied to any apparatus that reproduces the data stored in the optical disc. For example, the present invention may also be applied to the apparatus which reproduces image data stored in a DVD (Digital Versatile Disc). In this case, the image data, as reproduced ordinarily or specially, may be outputted to a display, a home theater projector or the like. In the structure where the operation device 400 is made independent, as shown in FIG. 15, the operation device 460 may also be connected with a reproducing device for other magnetic and/or optical recording media such as a magnetic disc, and the reproduction from the recording media and the reading and outputting of the data stored in the memory can be operated by the user.

According to the optical disc reproducing apparatus of the present invention, as has been described herein before, in case the scratch reproduction is performed by using the jog dial unit, the normal reproduction may be restarted immediately after the end of the scratch reproduction. According to the present invention, moreover, it is possible to provide the optical disc reproducing apparatus which can perform the pitchbend operation by using the jog dial unit without requiring the select button to change the functions.

Although only some exemplary embodiments of this present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

The disclosure Japanese Patent Applications No. 2003-391538 filed on Nov. 21, 2003, No. 2003-434156 filed on Dec. 26, 2003, and No. 2004-082003 filed on Mar. 22, 2004, including specifications, claims, drawings and abstracts are incorporated herein by reference in its entirety.

What is claimed is:

1. An optical disc reproducing apparatus comprising:
    a reading unit which reads audio data recorded in an optical disc;
    a storage unit which stores the audio data read by said reading unit;
    an operation disc unit disposed turnably;
    a first detection unit which detects a turning speed and a turning direction of said operation disc unit, and outputs a first signal indicating said turning speed and said turning direction;
    a second detection unit, which detects that an outer circumference of said operation disc unit is pushed, and outputs a second signal indicating the pushing; and
    a controller which controls the reading speed and the reading sequence of the stored audio data from said storage unit, on the basis of said first signal when inputted said first signal and said second signal, and which controls the reading speed of the stored audio data from said storage unit, on the basis of said first signal when inputted only said first signal.

2. The optical disc reproducing apparatus according to claim 1, comprising:
    an operation unit which accepts an input to instruct the reading speed and the reading sequence of the stored audio data from said storage unit, wherein
    said operation unit includes; said operation disc unit; a table on which said operation disc unit is mounted; said first detection unit; and said second detection unit.

3. The optical disc reproducing apparatus according to claim 1, wherein
    said controller controls, when only said first signal is outputted after the outputting of said first signal and said second signal, to read the audio data from said storage unit at a predetermined reading speed and in a predetermined reading sequence.

4. The optical disc reproducing apparatus according to claim 1, further comprising:
    an elastic element disposed below said operation disc unit, wherein
    said operation disc unit is movable upward and downward by elastic force of said elastic element.

5. The optical disc reproducing apparatus according to claim 2, further comprising:
    an elastic element disposed below said operation disc unit, wherein
    said operation disc unit is movable upward and downward by elastic force of said elastic element.

6. The optical disc reproducing apparatus according to claim 1, further comprising:
    a magnetic unit which makes said operation disc unit movable upward and downward by attractive force or repulsive force thereof.

7. The optical disc reproducing apparatus according to claim 2, further comprising:
    a magnetic unit which makes said operation disc unit movable upward and downward by the attractive force or the repulsive force thereof.

8. The optical disc reproducing apparatus according to claim 1, further comprising:
    a disc-shaped elastic element disposed below said operation disc unit; and
    a supporting element which supports the inner circumferences of said operation disc unit and said elastic element,
    wherein said second detection unit is disposed below the elastic element and outputs the second signal, when an outer circumference of said operation disc unit is pushed so that the circumference is brought into abutment against said elastic element by deformation of said elastic element according to the pushing.

9. The optical disc reproducing apparatus according to claim 7, wherein
    said controller controls, when only said first signal is outputted after the outputting of said first signal and said second signal, to read the stored audio data from said storage unit at a predetermined reading speed and in a predetermined reading sequence.

10. The optical disc reproducing apparatus according to claim 7, wherein
    a plurality of said second detection units are disposed below said operation disc unit and at a common circumference.

11. The optical disc reproducing apparatus according to claim 8, wherein
    a plurality of said second detection units are disposed below said operation disc unit and at a common circumference.

12. The optical disc reproducing apparatus according to claim 7, further comprising:
    a disc-shaped mat interposed between said table and said operation disc unit and having an area substantially equal to that of said operation disc unit.

13. The optical disc reproducing apparatus according to claim 8, further comprising:
a disc-shaped mat interposed between said table and said operation disc unit and having an area substantially equal to that of said operation disc unit.

14. The optical disc reproducing apparatus according to claim 9, further comprising:
a disc-shaped mat interposed between said table and said operation disc unit and having an area substantially equal to that of said operation disc unit.

15. The optical disc reproducing apparatus according to claim 1, further comprising:
a disc-shaped elastic element disposed below said operation disc unit; and
a supporting element which supports inner circumferences of said operation disc unit and said elastic element, wherein
said second detection unit is disposed below the elastic element and outputs the second signal, when an outer circumference of said operation disc unit is pushed so that it is brought into abutment against said elastic element by the deformation of said elastic element according to the pushing.

16. The optical disc reproducing apparatus according to claim 14, wherein
said controller controls, when only said first signal is outputted after the outputting of said first signal and said second signal, to read the stored audio data from said storage unit at a predetermined reading speed and in a predetermined reading sequence.

17. The optical disc reproducing apparatus according to claim 14, further comprising:
a disc-shaped mat interposed between said operation disc unit and said elastic element and having an area substantially equal to that of said operation disc unit.

18. The optical disc reproducing apparatus according to claim 15, further comprising:
a disc-shaped mat interposed between said operation disc unit and said elastic element and having an area substantially equal to that of said operation disc unit.

19. A reproducing apparatus operation device comprising a storage unit which stores audio data, and connected with an external reproduction apparatus which reproduces said stored audio data, wherein said operation device comprises:

an operation disc unit disposed turnably;

a first detection unit which detects a turning speed and a turning direction of said operation disc unit, and outputs a first signal indicating said turning speed and said turning direction;

a second detection unit which detects that the outer circumference of said operation disc unit is pushed, and outputs a second signal indicating the pushing; and a controller which controls the reading speed and the reading sequence of the stored audio data from said storage unit, on the basis of said first signal when inputted said first signal and said second signal, and which controls the reading speed of the stored audio data from said storage unit on the basis of said first signal when inputted only said first signal.

20. An audio data reproducing method using an optical disc reproducing apparatus, the apparatus including: an operation disc unit disposed turnably; a first detection unit which detects a turning speed and a turning direction of said operation disc unit and outputs a first signal; second detection unit which detect that an outer circumference of said operation disc unit is pushed, and outputs a second signal indicating the pushing; a reading unit which reads audio data recorded in an optical disc; and a storage unit which stores the audio data read by said reading unit, the method including:

controlling the reading speed and the reading sequence of the stored audio data from said storage unit, on the basis of said first signal when inputted said first signal and said second signal; and controlling the reading speed of the stored audio data from said storage unit, on the basis of said first signal when inputted only said first signal.

* * * * *